(12) United States Patent
Mitchell

(10) Patent No.: US 9,954,873 B2
(45) Date of Patent: Apr. 24, 2018

(54) MOBILE DEVICE-BASED INTRUSION PREVENTION SYSTEM

(71) Applicant: The MITRE Corporation, McLean, VA (US)

(72) Inventor: Mark Mitchell, Baltimore, MD (US)

(73) Assignee: THE MITRE CORPORATION, McLean, VA (US)

( * ) Notice: Subject to any disclaimer, the term of this patent is extended or adjusted under 35 U.S.C. 154(b) by 0 days.

(21) Appl. No.: 14/871,758

(22) Filed: Sep. 30, 2015

(65) Prior Publication Data

US 2017/0093891 A1    Mar. 30, 2017

(51) Int. Cl.
*H04L 29/06* (2006.01)
*H04W 88/02* (2009.01)
(Continued)

(52) U.S. Cl.
CPC .......... *H04L 63/1416* (2013.01); *H04L 49/90* (2013.01); *H04L 63/1441* (2013.01);
(Continued)

(58) Field of Classification Search
None
See application file for complete search history.

(56) References Cited

U.S. PATENT DOCUMENTS 5,636,371 A * 6/1997 Yu ........................... H04L 12/46
                                                        340/9.14
5,867,647 A * 2/1999 Haigh ..................... G06F 9/468
                                                        710/200
(Continued)

FOREIGN PATENT DOCUMENTS

| KR | 10-2015-0083627 | 7/2015 |
|----|-----------------|--------|
| WO | WO-2013/014033 | 1/2013 |
| WO | WO-2014/128284 | 8/2014 |

OTHER PUBLICATIONS

Arslanagic, Edina; "Personal Firewall in Mobile Phone"; 2007; Retrieved from the Internet: <URL: https://brage.bibsys.no/xmlui/handle/11250/137260>; pp. 1-80 as printed.*

(Continued)

*Primary Examiner* — Saleh Najjar
*Assistant Examiner* — Michael W Chao
(74) *Attorney, Agent, or Firm* — Morrison & Foerster, LLP

(57) ABSTRACT

A method for managing network traffic at a portable electronic device connected to a network that includes establishing a virtual network interface to queue network traffic originated by applications running on the device, monitoring the virtual network interface for queued data, assembling a data packet from the queued data, wherein at least some data in the data packet is intended for a node of the network, applying a first set of rules to the data packet, in accordance with a determination that application of the first set of rules triggers a predetermined response associated with the first set of rules, processing the data packet according to the predetermined response, and in accordance with a determination that application of the first set of rules does not trigger the predetermined response, forwarding at least a portion of the data packet to a connection with the node for transmission to the node.

13 Claims, 8 Drawing Sheets

(51) Int. Cl.
  *H04L 12/861* (2013.01)
  *H04L 12/911* (2013.01)
  *H04L 12/46* (2006.01)

(52) U.S. Cl.
  CPC .............. *H04L 63/20* (2013.01); *H04L 69/22* (2013.01); *H04W 88/02* (2013.01); *H04L 12/4641* (2013.01); *H04L 29/06585* (2013.01); *H04L 47/824* (2013.01); *H04L 63/0236* (2013.01); *H04L 69/161* (2013.01)

(56) References Cited

U.S. PATENT DOCUMENTS

| | | | |
|---|---|---|---|
| 5,913,024 A * | 6/1999 | Green | G06F 9/468 726/3 |
| 7,913,294 B1 * | 3/2011 | Maufer | H04L 12/66 370/389 |
| 8,108,933 B2 | 1/2012 | Mahaffey | |
| 8,365,288 B2 | 1/2013 | Yoo | |
| 8,484,733 B2 | 7/2013 | Pirzada et al. | |
| 8,495,700 B2 | 7/2013 | Shahbazi | |
| 8,631,488 B2 | 1/2014 | Oz et al. | |
| 8,671,438 B2 | 3/2014 | Parker et al. | |
| 8,683,595 B1 | 3/2014 | Barker | |
| 8,844,030 B2 | 9/2014 | Yoo | |
| 8,904,525 B1 | 12/2014 | Hodgman et al. | |
| 8,966,632 B1 | 2/2015 | Huang et al. | |
| 8,997,231 B2 | 3/2015 | Karta et al. | |
| 9,009,779 B2 | 4/2015 | Hegge et al. | |
| 9,027,140 B1 | 5/2015 | Watkins et al. | |
| 9,047,463 B2 | 6/2015 | Porras | |
| 9,059,949 B2 | 6/2015 | Belchee et al. | |
| 9,064,112 B2 | 6/2015 | Wang et al. | |
| 2003/0079146 A1 * | 4/2003 | Burstein | H04L 63/0281 726/12 |
| 2003/0172109 A1 * | 9/2003 | Dalton | G06F 9/468 709/203 |
| 2003/0231632 A1 * | 12/2003 | Haeberlen | H04L 29/06 370/395.5 |
| 2009/0296685 A1 * | 12/2009 | O'Shea | H04L 69/32 370/351 |
| 2010/0306540 A1 * | 12/2010 | Yamada | H04L 63/0485 713/168 |
| 2012/0005746 A1 | 1/2012 | Wei et al. | |
| 2012/0230202 A1 * | 9/2012 | Reed | H04L 63/0209 370/241 |
| 2012/0240183 A1 | 9/2012 | Sinha | |
| 2012/0278878 A1 | 11/2012 | Barkie et al. | |
| 2012/0278886 A1 | 11/2012 | Luna | |
| 2013/0007848 A1 | 1/2013 | Chaskar et al. | |
| 2013/0303154 A1 | 11/2013 | Gupta et al. | |
| 2014/0082729 A1 | 3/2014 | Shim et al. | |
| 2014/0143864 A1 | 5/2014 | Miliefsky | |
| 2014/0157353 A1 | 6/2014 | Shim et al. | |
| 2014/0179360 A1 | 6/2014 | Jackson et al. | |
| 2014/0373162 A1 | 12/2014 | Mahaffey et al. | |
| 2015/0106940 A1 | 4/2015 | Borghetti et al. | |
| 2016/0119234 A1 * | 4/2016 | Valencia Lopez | H04L 45/745 370/401 |

OTHER PUBLICATIONS

Arora, A. et al., "Malware Detection Using Network Traffic Analysis in Android Based Mobile Devices," *2014 Eighth International Conference on Next Generation Mobile Apps, Services and Technologies (NGMAST)*, Sep. 10-12, 2014, Oxford, UK: 66-71.

Liang, S. et al., "Permission-Combination-based Scheme for Android Mobile Malware Detection," *2014 IEEE International Conference on Communications (ICC)*, Jun. 10-14, 2014, Sydney, Australia; 6 pages.

Pieterse, H. et al., "Android Botnets on the Rise: Trends and Characteristics," *Information Security for South Africa (ISSA)*, Aug. 15-17, 2012, Johannesburg, South Africa; 5 pages.

Wei, T. et al., "Android Malware Detection via a Latent Network Behavior Analysis," *2012 IEEE 11th International Conference on Trust, Security and Privacy in Computing and Communications (TrustCom)*, Jun. 25-27, 2012, Liverpool, UK: 1251-1258.

* cited by examiner

MOBILE DEVICE-BASED INTRUSION PREVENTION SYSTEM

FIELD OF THE INVENTION

This invention relates to processing of network traffic and more specifically to processing of incoming and outgoing network traffic at a mobile device.

BACKGROUND OF THE INVENTION

As the use of mobile devices to transmit and receive data and access internet and intranet websites continues to expand, it becomes increasingly important that these devices be protected from malicious activity. If not protected, mobile devices are vulnerable to criminal or cyber attacks that could disrupt the normal functioning of both commerce and government. For example, vital communications can be disrupted, mobile communications devices can be used to hack into supposedly secure servers storing confidential information, mobile payment mechanisms can be used to steal money, or other malicious acts can be performed.

One approach for protecting conventional computing assets from viruses, malware, adware, exploits, and other computer attacks, is to analyze communication streams to and from the asset to detect malicious activity. Intrusion Prevention Systems (IPSs) are network security technologies that examine network traffic flows to detect and prevent vulnerability exploits. IPSs can take such actions as sending an alarm, dropping malicious packets, resetting connections, and blocking traffic from an offending IP address. Conventional IPSs generally fall into two categories: network-based and host-based. Network-based IPSs come in the form of dedicated hardware placed inline within a back end network. With cellular networks, which are commonly used by mobile devices, network-based IPSs cannot be implemented by end users because the back-end network is inaccessible.

Host-based IPSs reside on end user devices, such as laptops, and examine network traffic entering and leaving the device for malicious patterns. If maliciousness is recognized, action is taken such as blocking the packet, terminating connection, blocking the remote host, alerting the user, etc. To accomplish this, host-based IPSs generally require two privileges: access to the network interface and administrator rights (also known as superuser or root access).

With conventional mobile devices, neither of these two privileges is generally available, thus rendering traditional host-based IPS methods and systems unusable for mobile devices. As explained in U.S. Pat. No. 9,009,779, the interception of network traffic on a typical mobile device, such as a device running an Android™ operating system, is generally not possible under normal operation. Since the primary purpose of the device is to operate as a phone, phone manufacturers and cellular carriers limit applications to operating in the "user space" of the device, rather than in the "kernel space" or "machine space" that is typically required for network traffic interception. This limitation is implemented because any potential conflicts at such a low functional level would lead to the device becoming completely inoperable, rather than just unable to run a single application while still functioning for other purposes.

For example, conventional mobile device 102 in FIG. 1 includes multiple apps 108 operating in user space and network interface 110 operating in kernel space. Apps 108 may generate data for transmission over network 104 to one or more nodes 106 also connected to network 104, and one or more nodes 106 may transmit data back, all of which is processed by network interface 110. Network interface 110 includes both the physical and logical functions required to process inbound and outbound data at the device. The access of an app 108 to network interface 110 is generally limited to the processing of its own data. Furthermore, apps 108 interact individually with the kernel space, meaning that one app normally cannot interact directly with another app. Whereas a conventional IPS operating within a general computing device environment could examine transmitted and received data by directly accessing the network interface of the device, the same is not possible in mobile device 102 because of the restrictions on applications confined to user space. Because apps 108 cannot access the networking processes of network interface 110 and cannot access each other, it is generally not possible for an app to monitor the flow of data to and from other apps.

For these reasons, it is challenging to capture inbound and outbound traffic to and from applications running on a conventional mobile device without root access.

BRIEF SUMMARY OF THE INVENTION

Described herein are systems and methods for monitoring the network traffic generated and received by a mobile device from within a user space environment on the mobile device in which access to the network interface and to other applications is restricted. Special user privileges and root access to the device is not required. Inbound and outbound network traffic may be captured and analyzed to detect unwanted activity. The network traffic may be forwarded to its destination if no unwanted activity is detected, or the network traffic may blocked or otherwise handled according to predetermined responses to unwanted activity. Capture, analysis, blocking, and forwarding may be controlled from user space of the mobile device with user-level privilege to control of the device.

According to some embodiments, a virtual network interface is established at which inbound and outbound data is queued. According to some embodiments some, most, or all network traffic generated by applications running in user space on the mobile device can be queued at the virtual network interface. Queued data may be parsed and analyzed by applying one or more rules designed to detect malicious or otherwise unwanted activity. If unwanted activity is detected, the data can be dropped, the packet can be blocked, a connection can be terminated, a user can be alerted, and so on.

The data can also be further processed for transmission to its original destination. Networking functionality conventionally handled by kernel space processes can be replicated in user space to manage the processing and forwarding of data to applications running on the device and to nodes of the network. The user space networking functionality can deconstruct network traffic, reconstruct network traffic, forward the network traffic internally to an app or externally to a node of the network, and establish communication links with nodes of the network.

According to some embodiments, a method for managing network traffic includes, at a portable electronic device connected to a network, establishing a virtual network interface configured to queue network traffic originated by one or more applications running on the device, monitoring the virtual network interface for queued data originated by the one or more applications, assembling a data packet from at least some of the queued data, wherein at least some data in the data packet is intended for a node of the one or more nodes of the network, applying a first set of rules to the data packet, in accordance with a determination that application of the first set of rules to the data packet triggers a predetermined response associated with the first set of rules, processing the data packet according to the predetermined response associated with the first set of rules, and in accordance with a determination that application of the first set of rules does not trigger the predetermined response, forwarding at least a portion of the data packet to a connection with the node for transmission to the node.

Any of these embodiments may also include monitoring the connection with the node of the one or more nodes of the network for inbound data received by the device from the node, assembling an inbound data packet associated with a destination application running on the device from at least some of the received inbound data, applying a second set of rules to the inbound data packet, in accordance with a determination that application of the second set of rules to the inbound data packet triggers a predetermined response associated with the second set of rules, processing the data packet according to the predetermined response associated with the second set of rules, and in accordance with a determination that application of the second set of rules to the inbound data packet does not trigger a predetermined response associated with the second set of rules, forwarding the inbound data packet to the virtual network interface for retrieval by the destination application.

In any of these embodiments, forwarding the inbound data packet to the virtual network interface for retrieval by the destination application can comprise adding headers to the inbound data packet and forwarding the inbound data packet with the headers to the virtual network interface.

In any of these embodiments, assembling the data packet can include assembling at least a header portion and a payload portion, and the method can further include, prior to forwarding the at least a portion of the data packet to the connection with the node for transmission to the node, establishing the connection with the node using at least some information from the header portion, wherein the at least a portion of the data packet is forwarded without the header portion.

In any of these embodiments, the established connection can bypass the virtual network interface. In any of these embodiments, the data packet can be originated by an application of the one or more applications, and the method can further include maintaining an association between the established connection and the application, receiving data from the node through the established connection, and forwarding the data to the application based on the association between the established connection and the application.

In any of these embodiments, a header for the received data can be generated based on the association between the established connection and the application and the header is forwarded with the data. In any of these embodiments, the method can be performed with non-privileged control of the device. In any of these embodiments, the device can be configured to prevent applications from accessing kernel space networking functions.

In any of these embodiments, the method may further include determining that the data packet does not contain sufficient data to apply a rule of the one or more rules, in response to determining that the data packet does not contain sufficient data to apply the rule of the one or more rules, storing at least a portion of the data packet in a buffer, in response to detecting a second data packet at the virtual network interface, applying the rule of the one or more rules to a combination of at least a portion of the second data packet and the at least a portion of the data packet stored in the buffer to determine whether the rule applies to the combination, in accordance with a determination that application of the rule to the combination triggers a predetermined response associate with the rule, processing the at least a portion of the data packet according to the predetermined response associated with the rule, and in accordance with a determination that application of the rule to the combination does not trigger the predetermined response, forwarding the at least a portion of the data packet stored in the buffer and the at least a portion of the second data packet to the connection with the node for transmission to the node.

In any of these embodiments, the one or applications can comprise a plurality of applications. In any of these embodiments, monitoring the virtual network interface can be performed by an application other than the one or more applications. In any of these embodiments, the one or more applications can include at least one of an email application, a web browser, and a game application.

According to some embodiments, a portable electronic device for managing network traffic comprises one or more processors, memory, and one or more programs, wherein the one or more programs are stored in the memory and configured to be executed by the one or more processors, the one or more programs comprising instructions for establishing a virtual network interface configured to queue network traffic originated by one or more applications running on the device, monitoring the virtual network interface for queued data originated by the one or more applications, assembling a data packet from at least some of the queued data, wherein at least some data in the data packet is intended for a node of the one or more nodes of the network, applying a first set of rules to the data packet, in accordance with a determination that application of the first set of rules to the data packet triggers a predetermined response associated with the first set of rules, processing the data packet according to the predetermined response associated with the first set of rules, and in accordance with a determination that application of the first set of rules does not trigger the predetermined response, forwarding at least a portion of the data packet to a connection with the node for transmission to the node.

Any of these embodiments may also include instructions for monitoring the connection with the node of the one or more nodes of the network for inbound data received by the device from the node, assembling an inbound data packet associated with a destination application running on the device from at least some of the received inbound data, applying a second set of rules to the inbound data packet, in accordance with a determination that application of the second set of rules to the inbound data packet triggers a predetermined response associated with the second set of rules, processing the data packet according to the predetermined response associated with the second set of rules, and in accordance with a determination that application of the second set of rules to the inbound data packet does not trigger a predetermined response associated with the second set of rules, forwarding the inbound data packet to the virtual network interface for retrieval by the destination application.

In any of these embodiments, forwarding the inbound data packet to the virtual network interface for retrieval by the destination application can comprise adding headers to the inbound data packet and forwarding the inbound data packet with the headers to the virtual network interface.

In any of these embodiments, assembling the data packet can include assembling at least a header portion and a payload portion, and the instructions can further include, prior to forwarding the at least a portion of the data packet to the connection with the node for transmission to the node, establishing the connection with the node using at least some information from the header portion, wherein the at least a portion of the data packet is forwarded without the header portion.

In any of these embodiments, the established connection can bypass the virtual network interface. In any of these embodiments, the data packet can be originated by an application of the one or more applications, and the instructions can further include maintaining an association between the established connection and the application, receiving data from the node through the established connection, and forwarding the data to the application based on the association between the established connection and the application.

In any of these embodiments, a header for the received data can be generated based on the association between the established connection and the application and the header is forwarded with the data. In any of these embodiments, the instructions can be performed with non-privileged control of the device. In any of these embodiments, the device can be configured to prevent applications from accessing kernel space networking functions.

In any of these embodiments, the instructions may further include determining that the data packet does not contain sufficient data to apply a rule of the one or more rules, in response to determining that the data packet does not contain sufficient data to apply the rule of the one or more rules, storing at least a portion of the data packet in a buffer, in response to detecting a second data packet at the virtual network interface, applying the rule of the one or more rules to a combination of at least a portion of the second data packet and the at least a portion of the data packet stored in the buffer to determine whether the rule applies to the combination, in accordance with a determination that application of the rule to the combination triggers a predetermined response associate with the rule, processing the at least a portion of the data packet according to the predetermined response associated with the rule, and in accordance with a determination that application of the rule to the combination does not trigger the predetermined response, forwarding the at least a portion of the data packet stored in the buffer and the at least a portion of the second data packet to the connection with the node for transmission to the node.

In any of these embodiments, the one or applications can comprise a plurality of applications. In any of these embodiments, monitoring the virtual network interface can be performed by an application other than the one or more applications. In any of these embodiments, the one or more applications can include at least one of an email application, a web browser, and a game application.

According to some embodiments, a non-transitory computer readable storage medium stores one or more programs, the one or more programs comprise instructions for managing network traffic, which when executed by a portable electronic device, cause the device to establish a virtual network interface configured to queue network traffic originated by one or more applications running on the device, monitor the virtual network interface for queued data originated by the one or more applications, assemble a data packet from at least some of the queued data, wherein at least some data in the data packet is intended for a node of the one or more nodes of the network, apply a first set of rules to the data packet, in accordance with a determination that application of the first set of rules to the data packet triggers a predetermined response associated with the first set of rules, processing the data packet according to the predetermined response associated with the first set of rules, and in accordance with a determination that application of the first set of rules does not trigger the predetermined response, forwarding at least a portion of the data packet to a connection with the node for transmission to the node.

Any of these embodiments may also include instructions that cause the device to monitor the connection with the node of the one or more nodes of the network for inbound data received by the device from the node, assemble an inbound data packet associated with a destination application running on the device from at least some of the received inbound data, apply a second set of rules to the inbound data packet, in accordance with a determination that application of the second set of rules to the inbound data packet triggers a predetermined response associated with the second set of rules, process the data packet according to the predetermined response associated with the second set of rules, and in accordance with a determination that application of the second set of rules to the inbound data packet does not trigger a predetermined response associated with the second set of rules, forward the inbound data packet to the virtual network interface for retrieval by the destination application.

In any of these embodiments, forwarding the inbound data packet to the virtual network interface for retrieval by the destination application can comprise adding headers to the inbound data packet and forwarding the inbound data packet with the headers to the virtual network interface.

In any of these embodiments, assembling the data packet can include assembling at least a header portion and a payload portion, and the embodiments can further include instructions that cause the device to, prior to forwarding the at least a portion of the data packet to the connection with the node for transmission to the node, establish the connection with the node using at least some information from the header portion, wherein the at least a portion of the data packet is forwarded without the header portion.

In any of these embodiments, the established connection can bypass the virtual network interface. In any of these embodiments, the data packet can be originated by an application of the one or more applications, and the embodiments can further include instructions that cause the device to maintain an association between the established connection and the application, receive data from the node through the established connection, and forward the data to the application based on the association between the established connection and the application.

In any of these embodiments, a header for the received data can be generated based on the association between the established connection and the application and the header is forwarded with the data. In any of these embodiments, the instructions can be performed with non-privileged control of the device. In any of these embodiments, the device can be configured to prevent applications from accessing kernel space networking functions.

In any of these embodiments, the embodiments can further include instructions that cause the device to determine that the data packet does not contain sufficient data to apply a rule of the one or more rules, in response to determining that the data packet does not contain sufficient data to apply the rule of the one or more rules, store at least a portion of the data packet in a buffer, in response to detecting a second data packet at the virtual network interface, apply the rule of the one or more rules to a combination of at least a portion of the second data packet and the at least a portion of the data packet stored in the buffer to determine whether the rule applies to the combination, in accordance with a determination that application of the rule to the combination triggers a predetermined response associate with the rule, process the at least a portion of the data packet according to the predetermined response associated with the rule, and in accordance with a determination that application of the rule to the combination does not trigger the predetermined response, forward the at least a portion of the data packet stored in the buffer and the at least a portion of the second data packet to the connection with the node for transmission to the node.

In any of these embodiments, the one or applications can comprise a plurality of applications. In any of these embodiments, monitoring the virtual network interface can be performed by an application other than the one or more applications. In any of these embodiments, the one or more applications can include at least one of an email application, a web browser, and a game application.

DETAILED DESCRIPTION OF THE INVENTION

Figure 1:
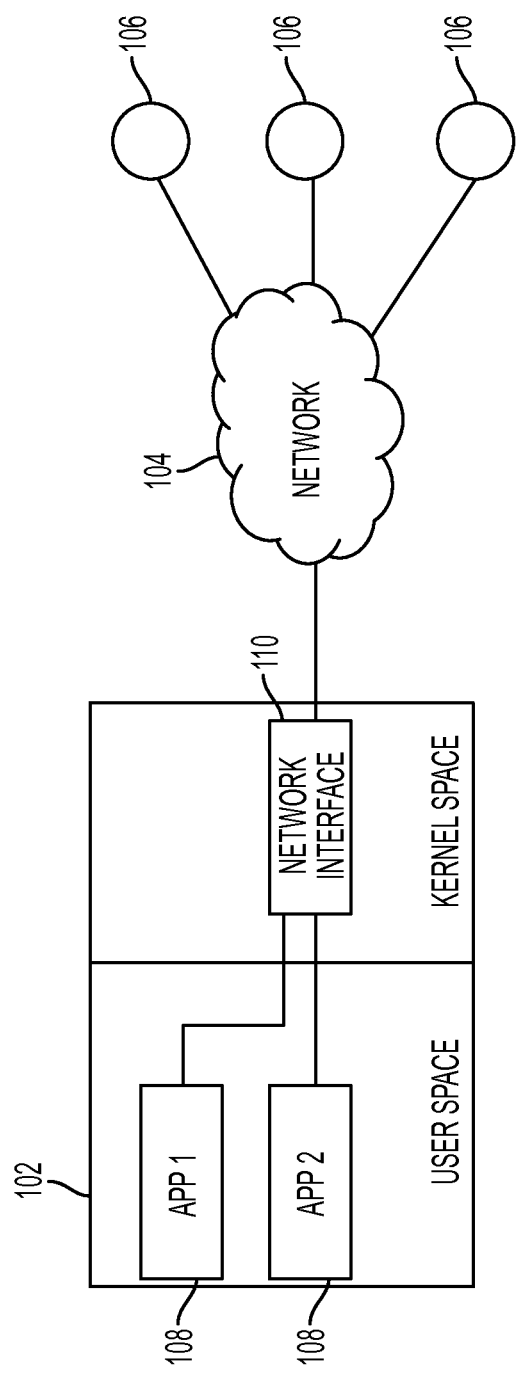
FIG. 1 is an illustration of a conventional mobile device.

Described herein are systems and methods for monitoring and controlling network traffic generated and received by a mobile device. The systems and methods described herein can be used to protect mobile devices such as smartphones from viruses, malware, adware, exploits, and other computer attacks.

The systems and methods enable monitor and control of network traffic through an IPS application running within a restricted computing environment. The restricted environment, which is present in many conventional mobile devices, limits access to networking functions and limits access from one application to another. Such an environment means that conventional IPS solutions that rely on access to networking resources generally will not work.

Whereas general computing environments enable access by applications to networking resources, the restricted computing environment of the systems and methods described herein severely limit such access. The manner in which conventional IPS solutions access networking solutions within a general computing environment is described below in order to illustrate the restricted computing environment within which the IPS systems and methods of the present invention operate.

As is well known in the art, most packet switched networks operate according to a set of established protocol layers, collectively defining a protocol stack. Each layer of the protocol stack exists to perform a specific function, such as addressing, routing, framing and physical transmission of packets. When a data packet is to be transmitted over a network from a source device to a destination device, the packet will pass in a downward direction through layers of the protocol stack on the source device, and in an upward direction through corresponding layers of the protocol stack on the destination device.

Each layer of the protocol stack in the transmitting process may add a respective header to the packet, which provides information to the corresponding layer in a receiving process. Thus, as a packet passes down through the protocol stack on a transmitting machine, the packet may gain an additional header at each layer. At the bottom of the stack, the transmitting process may then frame the data and physically transmit it over the network toward its destination. When the packet reaches its destination, the packet will then pass up through the protocol stack. Each layer of the stack in the receiving process may obtain useful information from its associated header and will strip its header from the packet before passing the packet up to the next layer for processing. At the top of the stack, the packet may then be processed by an application.

For example, the TCP/IP protocol stack includes, from lowest to highest, a link layer, a network or "IP" layer, a transport layer and an application layer. The link layer includes network interface card drivers to connect the machine to the physical network, such as an Ethernet network. The IP layer provides addressing information to facilitate independent routing of packets within or between networks. The transport layer allows source and destination devices to carry on a conversation with each other and includes a connection-oriented "TCP" (Transmission Control Protocol) layer and a connectionless "UDP" (User Datagram Protocol) layer. Finally, the application layer includes application programs that interface with a user and serve as the source for and destination of network traffic.

As is known in the art, the operating system of conventional general purpose computers as well as conventional mobile devices typically distinguish between two types of code: kernel code, and application code. Kernel code is the core of the operating system, handling matters such as process scheduling, memory management, hardware communication and network traffic processing. Application code, on the other hand, is the code used by applications, such as web browsers, email applications, and games. In operation, kernel code and application code are stored in separate portions of memory and are each executed by the computer processor (or multiple processors). Thus, kernel code is said to be running in "kernel space," and application code is said to be running in "user space." Applications may, however, use the kernel to access system resources and hardware through system calls, and are therefore thought of as running above, or on top of, the kernel. As described in more detail below, the access to these systems resources is generally much broader in general purpose computers than in mobile devices.

In conventional general computing devices and mobile devices, part of the protocol stack is implemented in kernel space and part is implemented in user space. For reference, the part that is implemented in kernel space may be referred to as the "kernel stack" (carried out by "kernel stack code"), and the part that is implemented in user space may be referred to as the "application stack" (carried out by "application stack code"). Considering the TCP/IP protocol suite, for instance, the link, network and transport layers are each implemented by kernel stack code running in kernel space, and the application layer is implemented by application stack code running in user space.

When a packet passes between the application and transport layers of the TCP/IP protocol stack, the packet moves between user space and kernel space. Once in user space, an application may process the packet. In general, when an incoming packet enters a device running a protocol stack, the destination of the packet may be an application running in the application layer. The packet will typically be processed by multiple layers of the protocol stack, finally arriving at its destination application. Similarly, an outgoing packet will typically be processed by multiple layers of the protocol stack before being transmitted onto the network.

In conventional mobile devices, an application running in user space is only able to view and operate on packets once the packets pass up through the protocol stack into the application layer and specifically to the portion of the application layer accessible by the application itself. General computing devices, on the other hand, often include functionality for an application to analyze, in user space, packets that are being processed by the kernel stack code. For example, many operating systems provide the ability for user-level processes to "sniff" or "capture" network traffic by employing "packet taps" in kernel space. However, this functionality generally is not available in mobile devices because of the restrictions imposed for the reasons discussed above. This restrictions may often be overcome by "jailbreaking" or "rooting" of a device (granting heightened privileges to and control over the device), as is well known in the art, but this is generally not advisable because it may expose the device to instabilities and vulnerabilities.

The systems and methods described herein can operate within the restricted computing environment of conventional mobile devices—in which conventional IPS solutions generally cannot work—to capture, analyze, and process inbound and outbound network traffic to detect unwanted activity. According to some embodiments, an IPS application running in user space of a mobile device captures and analyzes data generated by other applications running on the device before the data is transmitted over the network, and data received by the device before the data is forwarded to the other applications running on the device. The network traffic may be forwarded to its destination if no unwanted activity is detected, or blocked (or otherwise handled) according to predetermined responses to unwanted activity. According to the methods and systems described herein, capture, analysis, blocking, and forwarding of the network traffic may be controlled from an IPS application running in user space of the mobile device with user-level privilege to and control of the computing resources of the device.

According to some embodiments, the IPS application uses virtual private network (VPN) functionality built into the operating system of the mobile device in a non-conventional way to capture inbound and outbound network traffic. The IPS application can utilize a system call to establish a virtual network interface at which inbound and outbound network traffic can be queued. While no virtual private network may actually be established, using the VPN functionality in the non-conventional way described below can cause the mobile device to interrupt the normal network protocol stack processing of data packets at one or more stages (layers) and queue the data packets at the virtual network interface(s) where they may be retrieved and processed by the IPS application operating in user space with normal user privileges. Thus, the IPS application, according to embodiments, can be said to capture inbound and outbound data In some embodiments, captured data may be parsed and analyzed by applying one or more rules designed to detect malicious or otherwise unwanted activity. If unwanted activity is detected, the data can be dropped. For example, data can be analyzed according to rules such as: block a specific IP address (for example, one known to be associated with malware), block a specific stream of bytes that is known to be part of a network-based attack, block IP addresses from areas known for malicious activities (for example, a geographic location based on a geo-IP lookup or an address space such as "DarkNet"/The Onion Router (TOR) network).

In some embodiments, captured data may also be further processed for transmission to its original destination. For example, the IP address of the intended destination and/or the intended port may be determined by parsing the data, and new IP and TCP headers may be constructed. Networking functionality conventionally handled by kernel space processes can be replicated in user space to manage the processing and forwarding of data to applications running on the device and to nodes of the network. For example, TCP/IP networking functionality that conventionally operates in kernel space to transmit data generated by applications to nodes of the network may be replicated in user space. The user space networking functionality can deconstruct network traffic, reconstruct network traffic, forward the network traffic internally to an app or externally to a node of the network, and establish communication links with nodes of the network.

In some embodiments, the IPS application uses (VPN) functionality built into the operating system of the mobile device in a more conventional manner. That is, a VPN is established that connects the mobile device to a remote system (e.g., a VPN server or concentrator) while still allowing for the capture of inbound and outbound network traffic via a virtual network interface. In this way, the system can combine the features of a traditional VPN (e.g., secure communication) with the features of an IPS.

In the following description of the disclosure and embodiments, reference is made to the accompanying drawings in which are shown, by way of illustration, specific embodiments that can be practiced. It is to be understood that other embodiments and examples can be practiced and changes can be made without departing from the scope of the disclosure.

In addition, it is also to be understood that the singular forms "a," "an," and "the" used in the following description are intended to include the plural forms as well, unless the context clearly indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units, but do not preclude the presence or addition of one or more other features, integers, steps, operations, elements, components, units, and/or groups thereof.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing," "computing," "calculating," "determining," "displaying," or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems.

The present invention also relates to a device for performing the operations herein. This device may be specially constructed for the required purposes, or it may comprise a general-purpose computer selectively activated or reconfigured by a computer program stored in the computer. Such a computer program may be stored in a non-transitory computer readable storage medium, such as, but not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The methods, devices, and systems described herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein.

The following description is divided into several sections explaining various aspects of the systems and methods herein. In the first section, an intrusion prevention system, such as a mobile device running an IPS application within a network according to some embodiments, is described. The second section provides a more detailed description of the data capture and packet assembly performed by embodiments of the IPS application. The third section provides further explanation of data packet analysis and rule application performed by the IPS application according to some embodiments. The last sections describe processes that may be performed by IPS applications according to some embodiments, functional parts of IPS applications according to some embodiments, and rules that may be applied by IPS applications according to some embodiments.

Intrusion Prevention System

An intrusion prevention system, according to some embodiments, includes a mobile device connected to a network and executing an IPS application in user space with normal user privileges. The IPS application can capture inbound and outbound network traffic to and from the mobile device to detect and manage unwanted activity. The IPS application can further process captured data for forwarding to its respective destination, whether another application running on the device or a node of the network. According to some embodiments, the IPS application captures data by establishing a virtual network interface that interrupts the normal kernel space networking protocol stack processing. According to some embodiments, the IPS application implements normal kernel space networking protocol stack processes in user space to forward captured data to its destination.

Figure 2:
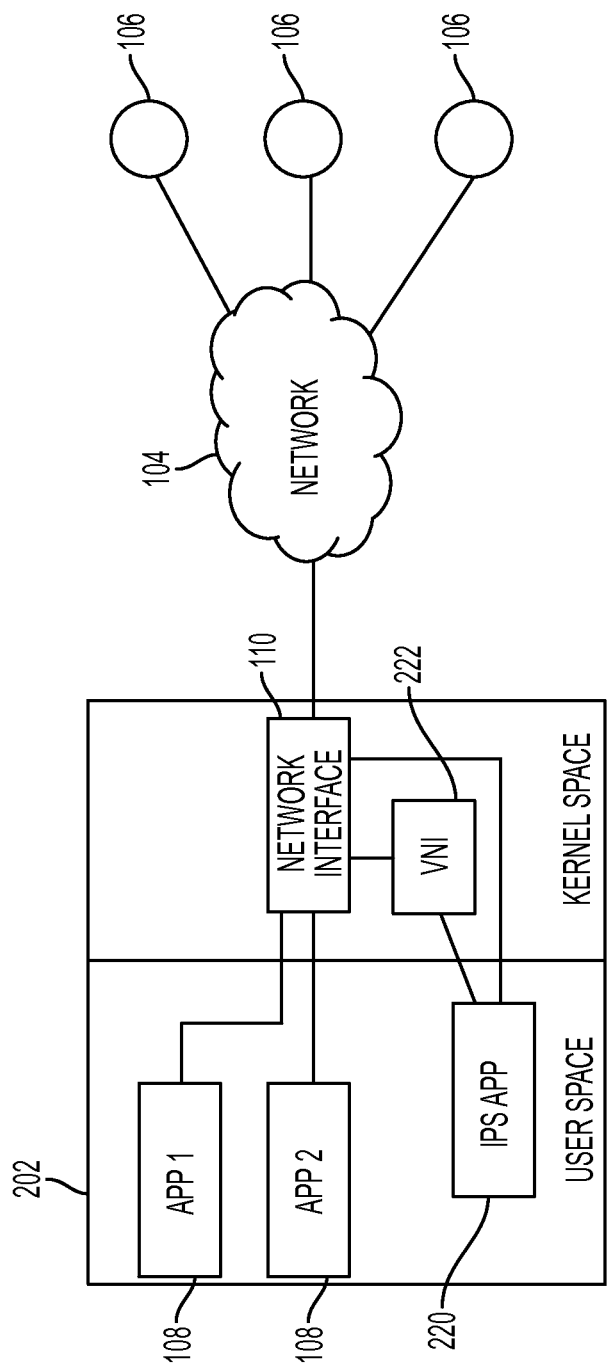
FIG. 2 is an illustration of a mobile device for capturing and analyzing network traffic according to some embodiments.

FIG. 2 illustrates a functional diagram of mobile device 202 according to some embodiments. Like conventional mobile device 102 of FIG. 1, mobile device 202 includes multiple apps 108 operating in the user-space of mobile device 202. Apps 108 generate data for transmission across network 104 to multiple nodes 106. Apps 108 may include any application running in user space of mobile device 202. For example, apps 108 may include an email application, a web browser, a game application, a VoIP application, an instant messaging application, a mobile banking application, a streaming music application, etc. Mobile device 202 transmits the network traffic to nodes 106 using network interface 110, which operates within the kernel space of mobile device 202. Mobile device 202 additionally includes virtual network interface 222 and IPS application 220. Mobile device may be a smart phone, PDA, tablet, or other type of computing device that communicates with a network.

Virtual network interface 222 facilitates the capture of network traffic. Virtual network interface 222 can be a software construct operating in kernel space that mimics the operation of a physical network interface. Virtual network interface 222 can be viewed as a simple Point-to-Point or Ethernet interface, which instead of receiving packets from a physical media, receives them from user space program and instead of sending packets via physical media sends them to the user space program. Virtual network interface 222 receives packets from apps 108 and sends them to IPS application 220. According to some embodiments, sending packet to IPS application 220 comprises writing the packets to a file stored in memory that is accessible by IPS application 220. According to some embodiments, virtual network interface 222 also receives packets from network 104 through network interface 110 and sends the packets to IPS application 220. Virtual network interface 222 operates in the kernel space of mobile device 202. According to some embodiments, virtual network interface 222 can be created through a systems call from IPS application 220 available through an API. Although referred to as a virtual network interface, it should be understood that virtual network interface 222 may comprises multiple virtual network interfaces. For example, virtual network interface 222 may include an interface for outbound traffic originated by applications running on the device, another interface for inbound traffic received from nodes of the network, and another interface for forwarding data back to applications running on the device.

IPS application 220 processes network traffic generated by apps 108 and received by mobile device 202 from network 104. According to some embodiments, IPS application 220 executes in the user space with normal user privileges. According to some embodiments, inbound and outbound network traffic is routed to virtual network interface 222 where it is processed by IPS application 220. IPS application 220 can retrieve the data from virtual network interface 222, analyze the data to determine whether the data triggers a predetermined response based on a set of rules, and either process the data according to the predetermined response or forward the data to the network. According to some embodiments, data is queued at virtual network interface 222, for example, in one or more files, and IPS application 220 can retrieve the data by reading from the file. Inbound and outbound network traffic can be queued separately. For example, inbound data may be retrieved by reading an inbound file and outbound data may be retrieved by reading an outbound file. In some embodiments, outbound data is queued at virtual network interface 222 but inbound data is not (e.g., upon establishing virtual network interface 222, inbound network traffic is handled conventionally by mobile device and forwarded to one or more apps running on the mobile device, or alternatively, is neither forwarded nor captured by virtual network interface 222).

IPS application 220 includes virtual network interface 222, communication module 224, and rules engine 226. Communication module 224 processes the data retrieved from virtual network interface 222 in order for rules engine 226 to apply one or more rules. For example, data may be retrieved one byte at a time and communication module 224 may assemble the bytes into a data packet. Communication module 224 can assemble a data packet using one or more communication protocols. For example, by referencing the IPv4 protocol, which defines the length, location, and contents of routing control information for Internet Protocol (IP) packets, communication module 224 can assemble bytes of data into an IP packet.

Once a packet is assembled, rules engine 226 applies one or more rules to the data packet. Application of a rule generally refers to comparing the data in the data packet to the one or more rules to see if predetermined responses defined by the one or more rules should be applied to the data. For example, according to some embodiments, the one or more rules include blocking traffic from a node of the network that is known to be associated with malicious activity. An inbound data packet is analyzed to determine whether its destination matches the internet address of the node. Where one or more rules match the data packet, a predetermined response is triggered. For example, blocking traffic from the node requires that the packet be dropped—that it not be forwarded to the destination application.

Where no rule is triggered, meaning that the data packet is not associated with malicious activity, the data packet may be forwarded to its destination. Communication module 224 can forward the data packet to its destination. According to some embodiments, where the data packet is inbound—i.e., destined for an application running on the device—the data packet is forwarded to the virtual network interface by communication module 224. According to some embodiments, where the data packet is outbound—i.e., destined for a node of the network—the data packet is forwarded to network interface 110 for transmission to the destination node by communication module 224.

Data Capture and Packet Assembly

In order to monitor and control inbound and outbound data to prevent unwanted activity, the IPS application may capture and assemble inbound and/or outbound data packets coming to the device from the network or generated by applications running on the device, respectively. The data capture and packet assembly processes, according to some embodiments, are described in more detail in the following paragraphs.

According to the methods and systems described herein, data can be captured by establishing a virtual network interface where inbound and outbound network traffic can be queued and made available to the user-space. A user-space application can call a function to establish a virtual network interface without kernel access or heightened privilege. By passing certain parameters to the function, the device can be configured to route all inbound and outbound data to the virtual network interface. For example, the Android operating system VPNService class may be used to establish a TUN interface. By configuring the interface with an internal IP address and a null route table (e.g., 0.0.0.0, 0), inbound and outbound traffic may be routed to the TUN interface. According to some embodiments, only outbound network traffic can be routed to the TUN interface, while inbound network traffic by-passes the virtual network interface or is otherwise not captured by the IPS application.

The virtual network interface may be available from operating systems such as Android™, Windows™, iOS™, UNIX™ and Linux. The virtual network interface functions as virtual network port that enables application programs to write packets as if they were writing to a physical network interface. According to some embodiments, the virtual network interface may be a TUN interface, which operates with layer 3 (IP layer) packets, as described in more detail below, or a TAP interface, which operates with operates with layer 2 packets like Ethernet frames.

According to some embodiments, data is queued byte by byte. Bytes can be retrieved from the interface and assembled to form a data packet. A data packet, as used herein, is a formatted unit of data for transmission through a network. The formatting of a unit of data is generally controlled by the protocol used. Many protocols may be used to transmit data from a source application to a destination application. Conventional networking methods employ abstraction and encapsulation techniques in which protocols are layered. A data packet generally includes network control information and a payload. Network control information is generally used by a given layer of abstraction to route the data packet from a source node or service to a destination node or service across the network. The payload is generally data that is intended for use by an application.

A data packet may include several layers of network control information often referred to as headers. The data packet may include layers of headers, wherein the stripping of a first layer of headers may reveal another layer of headers. For example, with reference to the Open Systems Interconnection model (OSI), a data packet as used herein may refer to a data unit at OSI Layer 4, the Transport Layer (also referred to as a segment or datagram), to a data unit at OSI Layer 3, the Network Layer, or to a data unit at OSI Layer 2, the Data Link Layer (also referred to as a frame). With reference to the TCP/IP model, a data packet may refer to a data unit at TCP/IP Layer 3, the transport layer, or to a data unit at TCP/IP Layer 2, the internet layer.

For example, a data packet may be an IP packet that includes a header portion and a payload. The header portion includes information for delivering the payload to the destination and the payload is data that is carried on behalf of an application. For example, the header portion may include information that specifies if it's an IPv4 or IPv6 packet, information about the length of the header in multiples of 4 bytes (e.g., 5 means 20 bytes), information about the length of the packet in bytes, an identification tag to help reconstruct the packet from several fragments, etc. The contents of an IP header are generally defined in relevant specifications and are not repeated here for simplicity. However, it should be appreciated that any data contained in a header, whether IP, Transport Control Protocol (TCP), User Datagram Protocol (UDP), or otherwise, may be analyzed according to the methods and systems described herein.

Analysis and Rule Application

Once data has been captured and packets assembled, according to some embodiments as described above, the IPS application may analyze the data packets and apply one or more rules to detect unwanted activity and apply corrective actions accordingly. Analysis of data packets may include analysis of its networking information, for example as contained within its headers, and analysis of its payload. Applications of rules to the information contained in a data packet may indicate unwanted activity, thus triggering a predetermined response such as dropping of the data packet. Further details of data packet analysis and rule application is provided in the following paragraphs.

According to some embodiments, after assembling a data packet from the queued data in the virtual network interface and/or after receiving a data packet from a connection with a node of the network (e.g., a socket connection), the data packet is analyzed and rules are applied to determine whether data packet contains or is associated with malicious activity. Although rules are often referred to herein as checking for "malicious" activity, it should be appreciated that the rules need not be limited to testing for malicious activity per se, but can test for any kind of activity. For example, the rules may be designed to restrict access to certain kinds of content, for example, to act as a parental control filter. Rules may also be designed, for example, to restrict use of the device running the IPS application to work-related activity only or to prevent sending or receiving media files that may use up excessive bandwidth or limited data allowances. The end goals of a given set of rules, whether pertaining to malicious activity or otherwise, are not intended to limit the methods and systems described herein.

According to some embodiments, after receiving/assembling a data packet from the capture process, the packet is checked for validity/integrity. For example, the processor checks if the checksum is correct and if the construction of the packet itself complies with relevant standards (for example, using TCP stack module 540 of FIG. 5, described below). If the packet is valid, it is then compared against the rules stored in the processor database. According to some embodiments, to complete the search quickly enough, an efficient Boyer-Moore string matching algorithm may be used. The Boyer-Moore algorithm has been shown to scale in linear time, with the proper optimizations applied.

According to some embodiments, rules are applied from most general to most specific, to reduce processing time when a packet matches more than one rule. For example, a first check may be application of geography rules, as they are the broadest, and there is no point in further analysis if a packet would already be rejected based on geographic origin. A next check may be based on IP address, port, and protocol. For example, specific IP addresses known to be associated with malware, botnets, or other malicious activity may be blocked. An example of rules associated with port and protocol may be to check what ports use the SSH protocol. Use of SSH over a port other than 22 is unusual and should likely be blocked and an alert raised to the user and/or system administrator. Another type of rule that may be applied is an exact byte pattern match. Such rules may look for byte patterns that are known to be part of an attack (e.g., Heartbleed) to ensure such attacks are not allowed to reach their destination.

According to some embodiments, networking control information, generally in the form of headers, are stripped off in stages to reveal the payload. Rules may be applied to information in the stripped headers and/or to the payload. According to some embodiments, rules are applied in sequential fashion and once a rule has triggered a response, an action is applied and the packet is not further analyzed. For example, for a TCIP/IP packet, an IP header is first stripped from the data packet and one or more rules are applied to information in the IP header. If application of the rules at the first level of abstraction, e.g., to the IP header information, does not trigger a response, the packet may then be further stripped of header information. For example, TCP header information may be stripped from the data packet. Rules may be applied to the TCP header information. For example, where a rule specified that an incorrect sequence number should results in the data packet being dumped, and the sequence number in the TCP header is incorrect, the data packet is dropped and the analysis ends.

Once all the networking control information has been stripped from the data packet, the remaining data is the payload. The payload contains the data destined for an application. For example, the payload for an email message may contain the sender and recipient email addresses, subject line, email body, etc. Rules can be applied to the payload. For example, a certain stream of bytes may indicate malicious activity and, therefore, the packet is dropped.

Intrusion Prevention Methods

The following methods illustrate the network traffic capture, data analysis and rule application, and data forwarding performed by some embodiments of IPS applications. The following methods can be used to detect unwanted activity at a mobile device from within an application running in restricted user space on the device.

Figure 3:
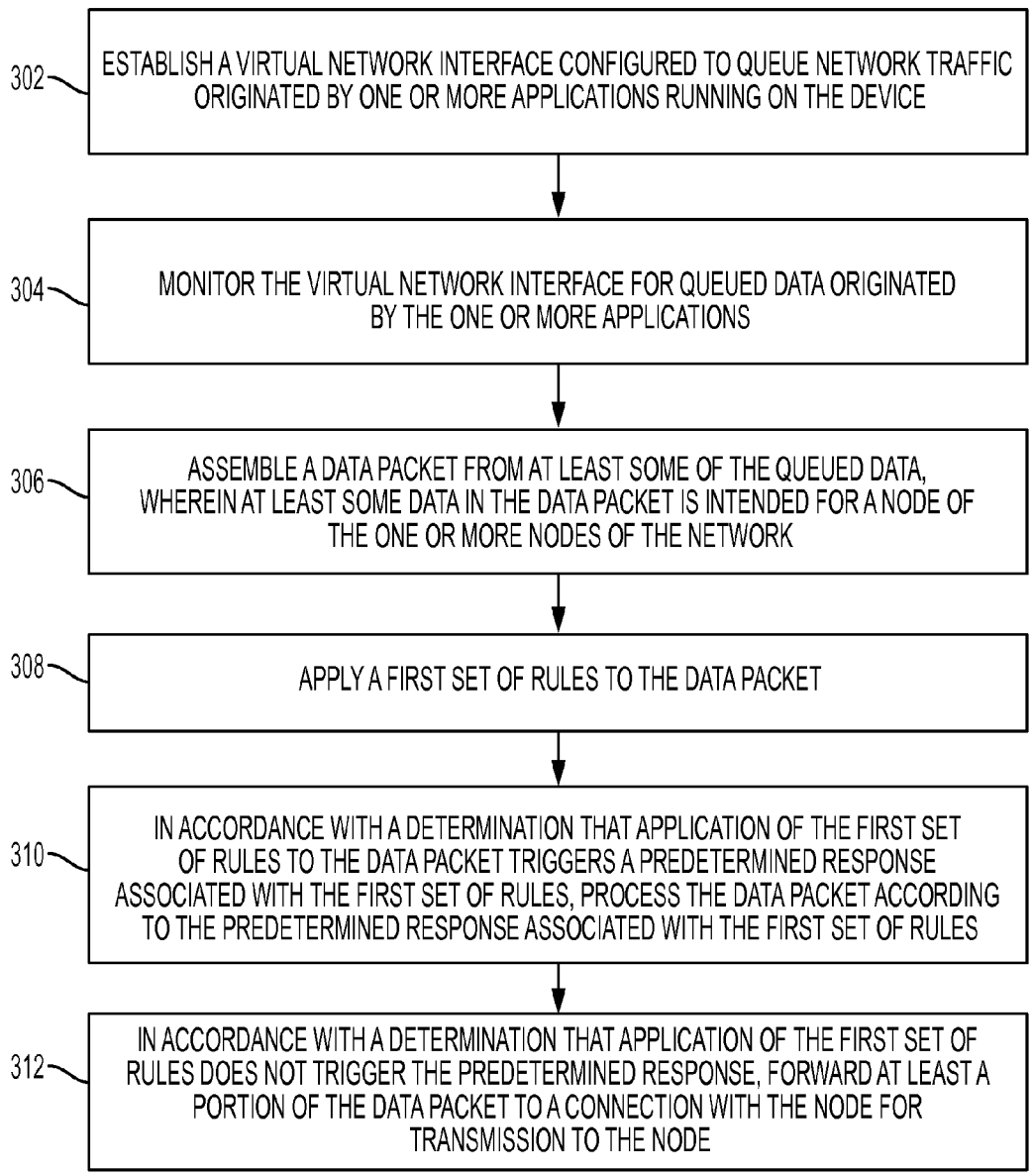
FIG. 3 is an illustration of a method for capturing and analyzing network traffic according to some embodiments.

FIG. 3 illustrates method 300 for capturing and analyzing inbound and outbound network traffic to detect malicious activity according to some embodiments. Method 300 may be performed at a portable electronic device, such as mobile device 202 of FIG. 2, connected to a network.

At step 302, a virtual network interface is established. The virtual network interface can be configured to queue network traffic originated by one or more applications running on the device. According to some embodiments, the virtual network interface (e.g., virtual network interface 222 of FIG. 2) can be established by a user space program (e.g., IPS application 220) by a system call available to the user space program by, for example, as defined by an Application Program Interface (API). According to some embodiments, once the virtual network interface is established, network traffic generated by applications running on the mobile device is processed to a given extent according to conventional networking procedures. However, the conventional procedures are interrupted at a given point and the data is queued at the virtual network interface instead of being further processed and transmitted by a physical network interface of the device. For example, according to some embodiments, network traffic generated by one or more programs is processed in kernel space and formatted into an IP packet that includes application data and routing data. The formatted IP packet can then be stored in the queue of the virtual network interface. According to some embodiments, queuing network traffic includes writing formatted data to one or more buffers or to one or more files stored on the mobile device. According to some embodiments, network traffic is queued at the virtual network interface one byte at a time.

According to some embodiments, some or all inbound network traffic can also be queued at the virtual network interface. Inbound network traffic is data received by the mobile device from one or more nodes of the network. In some embodiments, the inbound network traffic that is queued at the virtual network interface includes network traffic from remote hosts (node IP address and port number) with which the IPS application has not established a connection but does not include inbound network traffic received from remote hosts via one or more established connections. As described in more detail below, the IPS application may establish socket connections with one or more remote hosts to send and receive data to the one or more remote hosts upon initiation (or continuation) of communication by one or more apps running on the device. These socket connections may be "protected" from the virtual network interface such that the data sent/received through these connections is not queued at the virtual network interface. Inbound network traffic that is not received via one of these socket connections can be queued at the virtual network interface.

Inbound network traffic may be processed according to conventional procedures up to a predetermined point prior to queuing in the virtual network interface. For example, the inbound network traffic may be stripped of one or more layers of networking information until the network traffic is in the form of an IP packet. The IP packet may then be queued at the virtual network interface. According to some embodiments, inbound network traffic is queued in a dedicated queue that is different from the outbound data queue. For example, inbound traffic may be written to a different buffer or a different file than outbound traffic.

At step 304, the virtual network interface is monitored for queued data originated by the one or more applications. According to some embodiments, the queue (e.g., the outbound data queue) may be checked periodically to determine whether network traffic data has been generated and queued. According to some embodiments, a function call can be executed to read an outbound data queue to determine whether new data is present. According to some embodiments, checking the queue may reveal that a single byte of new data has been queued or that multiple bytes of data have been queued. According to some embodiments, a user space program (e.g., IPS application 220) attaches to the virtual network interface and gets a special file descriptor. The virtual network interface is monitored by reading from the special file descriptor, giving the data that the applications are sending out. According to some embodiments, monitoring the virtual network interface comprises reading the contents of a buffer. According to some embodiments, once the buffer is read, the buffer is cleared.

At step 306, a data packet is assembled from at least some of the queued data. Data may be queued at the virtual network interface in sets (e.g., one byte at a time). The sets of data can be retrieved from the virtual network interface and stored in the user space for assembly. Once the data for a complete data packet has been retrieved from the queue, the data packet can be assembled for further processing. Assembling a data packet may include indicating a certain grouping of data retrieved from the queue as belonging to a single data packet based on the order in which it was received from the queue. Assembly may also include reading contents of the data to determine how to assemble the data packet (i.e., what kind of packet is it—e.g., IPv4 vs. IPv6). For example, according to some embodiments, the virtual network interface is configured to queue IP packets one byte at a time. Each byte of an IP packet containing data generated by an application running on the device can be retrieved from the network interface queue. Once all bytes of the complete IP packet have been retrieved from the queue, the data packet is "assembled." According to some embodiments, assembling the data packet may include storing the data in one or more data constructs. According to some embodiments, data associated with routing of the data packet such as header data may be stored in a header construct and data associated with a payload may be stored in a separate data construct.

At least some data in the data packet is intended for a node of the one or more nodes of the network. The data packet can include a payload that is intended for an application running on the node of the network. For example, the data packet may include a payload that includes data generated by an email application running on the device that is intended to be transmitted to an email server running on one of the nodes of the network.

At step 308, a first set of rules are applied to the data packet. According to some embodiments, a set of rules identify certain properties of a data packet as being associated with known malicious activity. For example, a given rule may specify that a certain node of the network is known to be associated with malicious activity and if any packets are destined for that node, they should not be sent. Application of this rule to the data packet would include determining the destination node address for the data packet and comparing that destination node address to the known bad node address. Rules are discussed in more detail below. According to some embodiments, the first set of rules may include just a single rule or may include multiple rules. The rules may apply to any of the data. For example some rules may apply to the routing information contained in the header and other rules may apply to the payload data.

According to some embodiments, rules may be applied sequentially. For example, rules may be applied based on the amount of processing required to apply the rule. For example, comparing the destination node to known bad nodes may require less processing than determining whether the payload includes known malicious content, so the rule directed to the destination node address may be applied first. If the rule is triggered, meaning that the data packet should not be transmitted to the known bad destination node, the packet may be dropped and no further rules need be applied, as discussed in more detail below.

At step 310, in accordance with a determination that application of the first set of rules to the data packet triggers a predetermined response associated with the first set of rules, the data packet is processed according to the predetermined response associated with the first set of rules. Each rule is generally associated with a predetermined response. Responses can include, for example, dropping the data packet—i.e., not forwarding it to its destination—or blocking an entire stream of data, which includes blocking future data packets associated with the data packet. If the conditions of a rule are met, the predetermined response is triggered and the data packet is processed according to the predetermined response (e.g., the data packet is dropped). Determining that application of the first set of rules to the data packet triggers a predetermined response may include determining that only one predetermined response is triggered or may include that multiple predetermined responses are triggered. For example, according to some embodiments, as soon as a single predetermined response is triggered, the data packet is processed accordingly and no further analysis is conducted. According to other embodiments, the rules continue to be applied even after determining that a predetermined response is triggered and, thus, application of multiple rules in the first set of rules results in multiple predetermined responses being triggered. In these embodiments, multiple responses may be executed. For example, the data packet may be dropped and the stream of future data packets associated with the data packet may be blocked.

At step 312, in accordance with a determination that application of the first set of rules does not trigger a predetermined response, at least a portion of the data packet is forwarded to a connection with the node for transmission to the node. Once the rules have been applied to the data packet and a predetermined response associated with the rules is not triggered—i.e., the data packet is determined to not be associated with malicious activity—the data packet or a portion of the data packet may be forwarded for transmission to the node of the network to which it was originally destined. According to some embodiments, a connection between the mobile device and the node has been established, the data packet is forwarded to that connection, and the mobile device processes the data packet and transmits it to the node of the network using the established connection.

According to some embodiments, establishment and maintenance of the connection is managed in kernel space. User space APIs may enable a user space program to request the establishment of a connection to a node of the network and to forward data packets to the connection. For example, a connection has been established between a socket on the mobile device and a socket on the destination node, according to known methods. A socket is generally a kernel space construct that manages a communication stream with a node of the network.

According to some embodiments, the data packet assembled from the virtual network interface is formatted according to a first transmission protocol while the connection with the node of the network requires data to be formatted according to a second transmission protocol that is different from the first. For example, the virtual network interface may queue IP packets, whereas data forwarded to the connection may be required to be in the form of a TCP packet. Thus, portions of the data packet may be added or removed to conform to the required formatting. For example, an IP packet may wrap a TCP packet in additional networking information contained in a header. This additional IP-specific header information may be stripped from the data packet leaving a TCP formatted data set or packet. The TCP formatted data may then be forwarded for transmission by the mobile device using the established connection with the node of the network.

According to some embodiments, data forwarded to the connection bypasses the virtual network interface. For example, an API may be used to "protect" the connection from the virtual network interface such that the data forwarded to the connection is not re-routed to the virtual network interface.

Figure 4A:
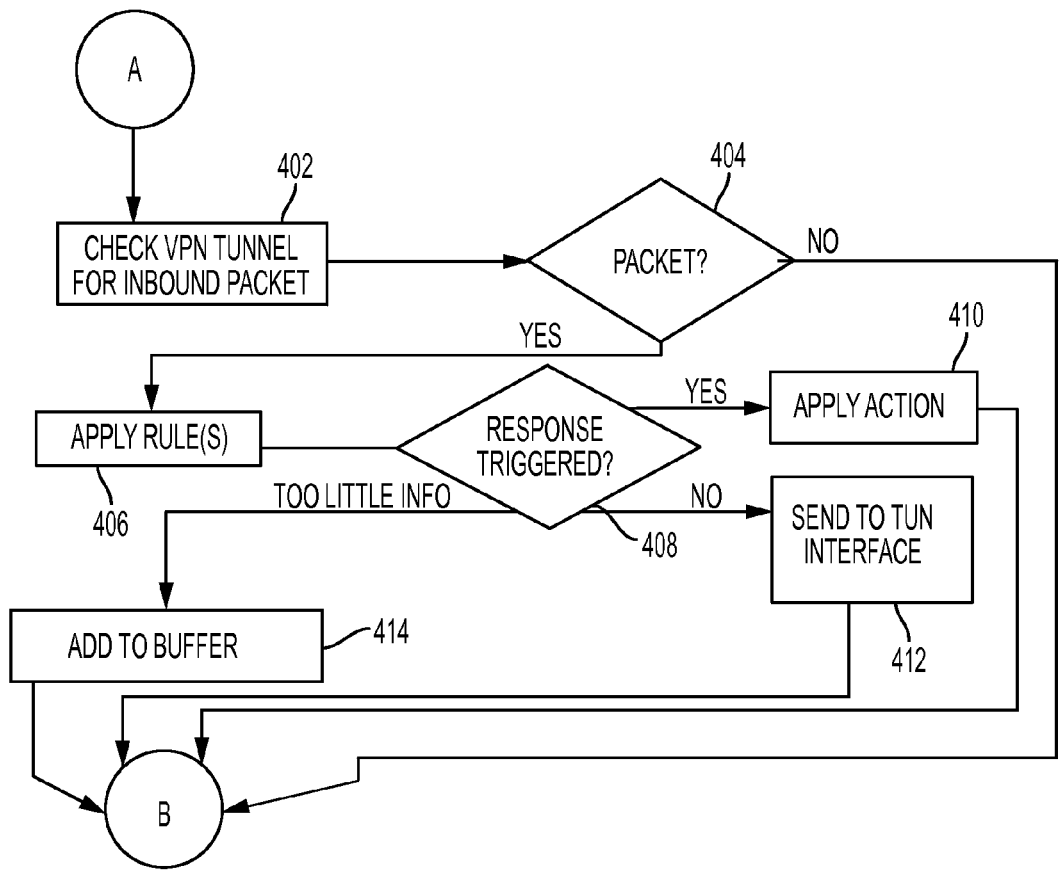
FIG. 4A is an illustration of a method for capturing and analyzing network traffic according to some embodiments.
Figure 4B:
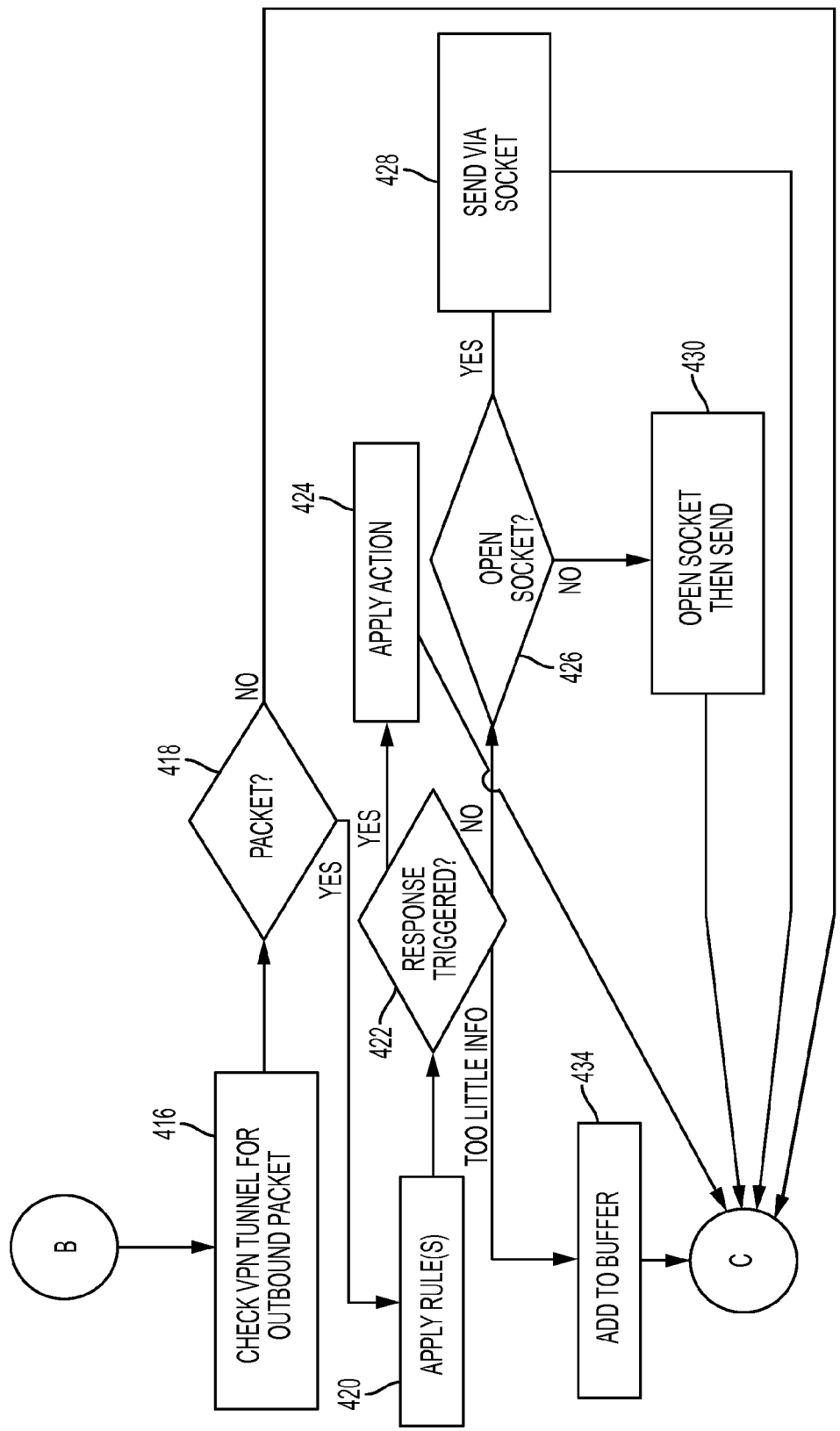
FIG. 4B is an illustration of a method for capturing and analyzing network traffic according to some embodiments.

FIGS. 4A-4B illustrate method 400 for capturing and analyzing inbound and outbound network traffic to detect malicious activity according to some embodiments. Method 400 may be performed at a portable electronic device, such as mobile device 202 of FIG. 2, connected to a network.

At step 402 a virtual network interface is checked for an inbound data packet. An inbound data packet is a data packet sent by a node of the network to the device. The virtual network interface may be established at a prior time according to the methods described above. Checking the virtual network interface for an inbound packet may include both monitoring the virtual network interface for inbound data and assembly of the inbound data into a data packet.

Upon determining 404 that a packet is present (and/or that a packet has been assembled), one or more rules are applied at step 406. The contents of the data packet may be checked against conditional statements in the one or more rules. For example, application of a rule that specifies that data packets received from an IP address (node of the network) known to be associated with malicious activity should be dropped may include parsing header information in the data packet to determine the IP address of the sending node and comparison of the sending node's IP address to the IP address specified by the rule.

A match between a rule and contents of the data packet may trigger a response associated with the rule. Upon a determination 408 that a response is triggered based on a match between a rule and contents of the data packet, the action associated with the rule is applied to the data packet in step 410. For example, where the rule specifies that a data packet from a given IP address should be dropped, the data packet is dropped at step 410. After application of the action, the process proceeds to step 416 of FIG. 4B.

Continuing to refer to FIG. 4A, if determination 408 indicates that no response is triggered, then the data packet may be sent to the virtual network interface for forwarding to a destination application at step 412. For example, where the data packet includes an email sent by an email server of the network to an email application running in user space of the device, the data packet is sent to the virtual network interface for forwarding to the email application. According to some embodiments, the virtual network interface may include a queue that may be written to by a user space application attached to the virtual network interface (e.g., IPS application 220 of FIG. 2). Data written to the queue by the user space application may then be sent to or retrieved by other applications running on the device as if the data had been received from a physical network interface according to conventional methods. The queue to which data is written from the user space application is generally different from the queue used to queue inbound data received from the network.

According to some embodiments, inbound data queued in the virtual network interface is formatted in the same manner as data forwarded to the virtual network interface after application of the rules. Thus, the data packet queued in the virtual network interface before rule application may be substantially identical to the data packet written to the virtual network interface after rule processing. Thus, in some embodiments, no networking control information need be added or removed from the data packet.

According to some embodiments, determination 408 of whether a response is triggered based on application of the rules indicates that insufficient information is present in the data packet to determine whether one or more responses are triggered. For example, one or more rules may apply to the payload of the data packet to determine whether the contents of the payload (the information destined for an application running on the device) indicate malicious activity. In some instances, the contents of a single payload may be insufficient to determine whether there is a match with a rule. A simple example of this would be where a rule specifies blocking a data stream where the contents of the data stream include the character string CAT (for example, because CAT is known to be included in malicious code), and a data packet's payload includes only the character C. The next data packet's payload may include the letters AT. So, assembly of the two payloads would trigger the blocking of the data stream based on a match with the rule. Thus, the first data packet containing the letter C does not contain sufficient information to resolve whether the rule based on CAT is triggered.

When the determination is made that the data packet contains insufficient information, the data packet or a portion of the data packet can be stored in a buffer at step 414. According to some embodiments, data may already be stored in the buffer and data in the data packet may be combined with the data stored in the buffer and one or more rules may be applied to the combined data. According to some embodiments, the data packet may be stored in the buffer, combined with data from a subsequently received data packet, and one or more rules may be applied to the combination. According to some embodiments, a determination is made that a combination of the buffered data or a combination of the buffered data with newly processed data results in sufficient information to apply the rules that could not be previously resolved, the buffered data may be sent to the virtual network interface (e.g., according to step 412). Data may continue to be stored in the buffer until sufficient information is available in a combination of the buffered data (along with data in a newly received data packet) to apply a rule. Once the rules have been successfully applied to the combination, the data can be forwarded to a destination application as discussed above with respect to step 412.

According to some embodiments, once data is stored in the buffer, the process proceeds to step 416 of FIG. 4B. Referring back to determination 404 of whether a data packet is present at the virtual network interface, if no data packet is present, the process proceeds to step 416.

Referring to FIG. 4B, at step 416, the virtual network interface is checked to determine whether an outbound data packet is present. Outbound data in the outbound data packet is generated by an application running in user space on the device. The outbound data is destined for a node of the network. Checking the virtual network interface for an outbound packet may include both monitoring the virtual network interface for outbound data and assembly of the outbound data into a data packet.

Upon determining 418 that a packet is present (and/or that a packet has been assembled), one or more rules are applied at step 420. The contents of the data packet may be checked against conditional statements in the one or more rules. For example, application of a rule that specifies that data packets destined for an IP address (node of the network) known to be associated with malicious activity should be dropped may include parsing header information in the data packet to determine the destination IP address and comparison of destination IP address to the IP address specified by the rule.

A match between a rule and contents of the data packet may trigger a response associated with the rule. Upon a determination 422 that a response is triggered based on a match between a rule and contents of the data packet, the action associated with the rule is applied to the data packet in step 424. For example, where the rule specifies that a data packet destined for a given IP address should be dropped, the data packet is dropped at step 424. After application of the action, the process proceeds to step 436 of FIG. 4C.

Continuing to refer to FIG. 4B, if determination 422 indicates that no response is triggered, then the data packet may be further processed for transmission to the destination node of the network. At step 426, a determination is made whether a connection with the destination node has already been established. For example, where data generated by an application running on the device has already been transmitted to the destination node, the communication may have already been established. If the connection has already been established, then the data packet is forwarded to the connection for transmission by the device over the network to the destination node at step 428.

According to some embodiments, a data packet retrieved from the virtual network interface may be formatted in accordance with a first protocol whereas data forwarded to the connection with the node of the network may be formatted in accordance with a second protocol that is different from the first. In these embodiments, the data packet is modified from the first protocol format to the second protocol format prior to sending to the connection. For example, according to some embodiments, a data packet retrieved from the virtual network interface may be an IP data packet that includes IP header layers that encapsulate a TCP packet, whereas a data packet sent to the established connection may be a TCP only packet. Thus, the IP headers must first be stripped from the data packet before forwarding to the connection.

If a connection has not been established as determined in step 426, then a new connection between the device and the destination node for the data packet is established in step 430. Establishment of a new connection generally includes using kernel space operations available to user space applications through one or more APIs. The user space application can specify the destination node address (e.g., IP address) and destination node port, and the local address (e.g., IP address) and local port, and the device will execute operations in kernel space to open the connection according to known methods. This generally includes executing handshake operations that establish a connection end at the destination node. These handshake operations may be executed in kernel space according to known networking functionality. The established connection is specific to the destination node and port and to the user space application running on the device. The association between the destination node address/port and the source application is maintained in order to route data received from the destination node through the connection back to the source application, as described in more detail below. The information required to establish the connection may be obtained from the header information contained in the data packet.

Once the connection is established, the data packet is forwarded to the connection for transmission to the node of the network. The process then proceeds to step 436 in FIG. 4C.

According to some embodiments, determination 432 of whether a response is triggered based on application of the rules indicates that insufficient information is present in the data packet to determine whether one or more responses are triggered. This determination is similar to that described above with respect to step 408. When the determination is made that the data packet contains insufficient information, the data packet or a portion of the data packet is stored in a buffer at step 434 in similar fashion to the process described above with respect to step 414. Data from subsequent data packets may continue to be buffered until all rules can be resolved. Once the rules have been resolved and the data has been cleared for forwarding, all the buffered data may be forwarded to an open connection or otherwise forwarded as discussed with respect to step 426 above.

Figure 4C:
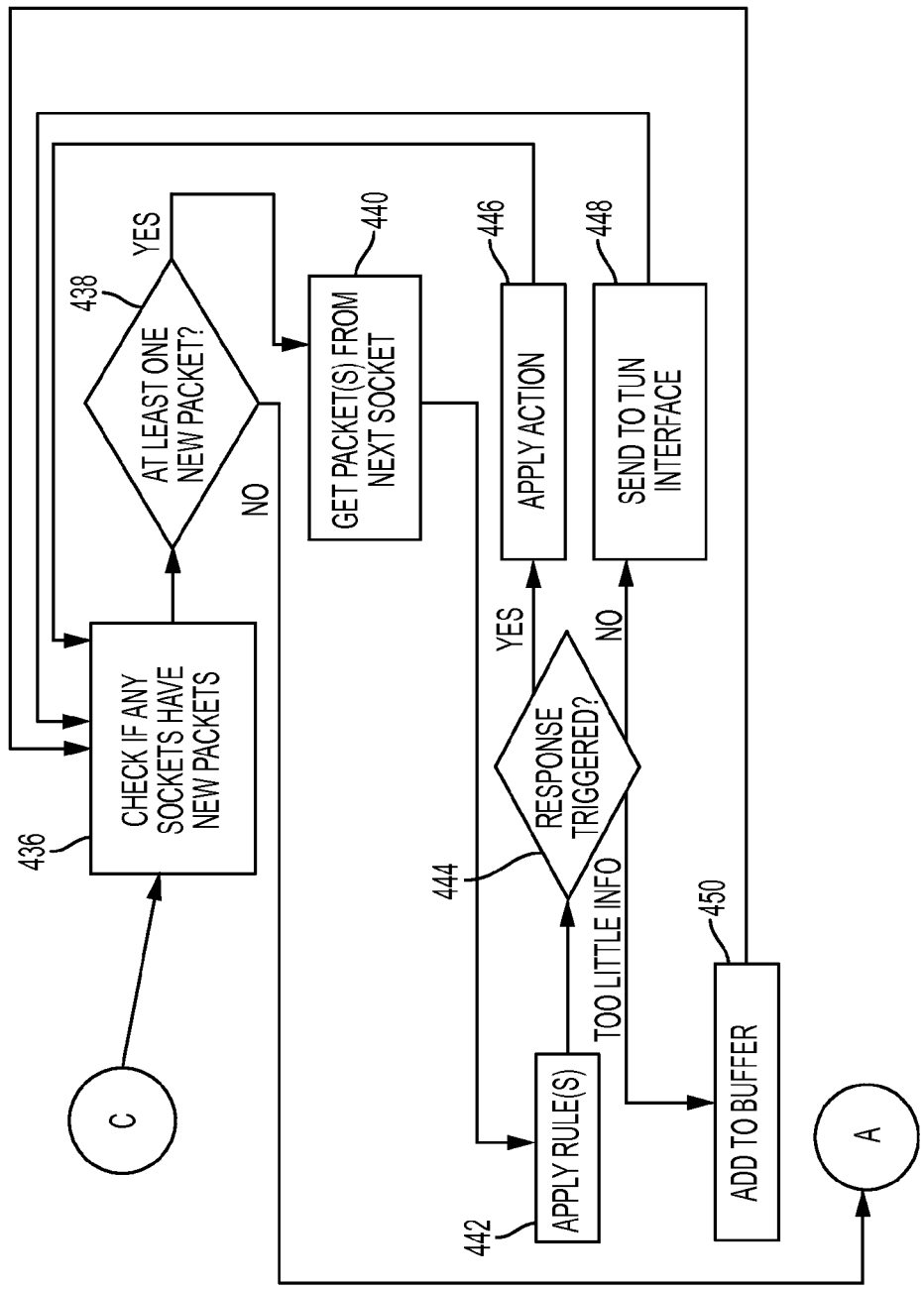
FIG. 4C is an illustration of a method for capturing and analyzing network traffic according to some embodiments.

According to some embodiments, once data is stored in the buffer, the process proceeds to step 436 of FIG. 4C. Referring back to determination 418 of whether a data packet is present at the virtual network interface, if no data packet is present, the process proceeds to step 436.

Referring to FIG. 4C, at step 436, established connections are checked to determine whether any have new data received from nodes of the network. The established connections checked in step 436 include connections previously established according to the methods described above with respect to step 430. Generally, a particular connection is associated with a node/port of the network and an application on the device, and thus, multiple communication streams between the device and nodes of the network result in multiple connections being checked in step 436. Data packets received from a node of the network over an established connection may be queued in a buffer, and the connections may be checked by reading from the buffers. According to some embodiments, the connections are checked sequentially until new data is found. Once new data is found, it may be processed according to the steps described below and then any additional connections may be checked. According to some embodiments, checking established connections for new data may include both monitoring the connections for inbound data and assembly of the inbound data into data packets. According to some embodiments, data is queued at a connection interface (e.g., a buffer associated with the connection) and the data is retrieved from the queue by reading a data construct associated with the interface (e.g., by reading from the buffer).

After a determination 438 that at least one connection has a new data packet, the inbound data packet is retrieved from the connection. A step 442, the contents of the data packet may be checked against conditional statements in one or more rules. The one or more rules used during this step may be the same as those used for outbound data or they may be different. For example, one set of rules may be applied to inbound data and another, different, set of rules may be applied to outbound data. One or more rules may be included in both inbound and outbound sets. According to some embodiments, a set of rules applied to inbound data received from one or more connections may be different than a set of rules applied to inbound data retrieved from the virtual network interface. For example, one or more rules applied to inbound data retrieved from the virtual network interface may include checking the source node IP address, whereas the IP address associated with data received from a connection with a node has already been vetted and further checking is unnecessary. Therefore, one or more rules applicable to sending node IP address may not be applied to data packets received from connections with nodes of the network. For example, application of a rule that specifies that data packets received from an IP address (node of the network) known to be associated with malicious activity should be dropped may include parsing header information in the data packet to determine the IP address of the sending node and comparison of the sending node's IP address to the IP address specified by the rule.

A match between a rule and contents of the data packet may trigger a response associated with the rule as discussed above. Upon a determination 444 that a response is triggered based on a match between a rule and contents of the data packet, the action associated with the rule is applied to the data packet in step 446, which is similar to the process described above with respect to step 424. After application of an action, the process may return to step 436 to check if other connections have new data. If no new data is present in any connection, then the process proceeds back to the start at step 402 of FIG. 4A.

Continuing to refer to FIG. 4C, if determination 444 indicates that no response is triggered, then the data packet may be sent to the virtual network interface for forwarding to a destination application at step 448. This step is similar to step 412 of FIG. 4A, as discussed above.

According to some embodiments, inbound data retrieved from an established connection is formatted differently that the data sent to the virtual network interface after rule application. Thus, in some embodiments, networking control information must be added or removed prior to sending the data packet to the virtual network interface. For example, according to some embodiments, the data retrieved from the connection is payload only—without TCP and IP headers (which have been stripped by the network interface stack operating in kernel space), whereas a data packet sent to the virtual network interface is an IP data packet. In these embodiments, the TCP data packet must be encapsulated with IP headers. Information about the connection from which the data packet was retrieved can be used to create the IP headers. For example, the sending node/port information is associated with the connection as is the destination node/port on the device indicating the destination application running in user space. These associations may be maintained (e.g., in a file, log, table, etc.) and used to create IP headers, such that sending/forwarding the data packet to the virtual network interface results in the data packet being retrieved by the destination application as if the data packet had been received from the physical network interface of the device.

According to some embodiments, determination 444 of whether a response is triggered based on application of the rules indicates that insufficient information is present in the data packet to determine whether one or more responses are triggered as discussed above. This step is similar to step 408 described above. When the determination is made that the data packet contains insufficient information, the data packet can be stored in a buffer at step 450 in similar fashion to the process described above with respect to step 414.

According to some embodiments, once data is stored in the buffer at step 450, the process returns to step 436 for checking the connections to determine whether new data is queued.

Referring back to determination 418 of whether a data packet is present at the virtual network interface, if no data packet is present, the process proceeds to step 436.

Intrusion Prevention System Device

Figure 5:
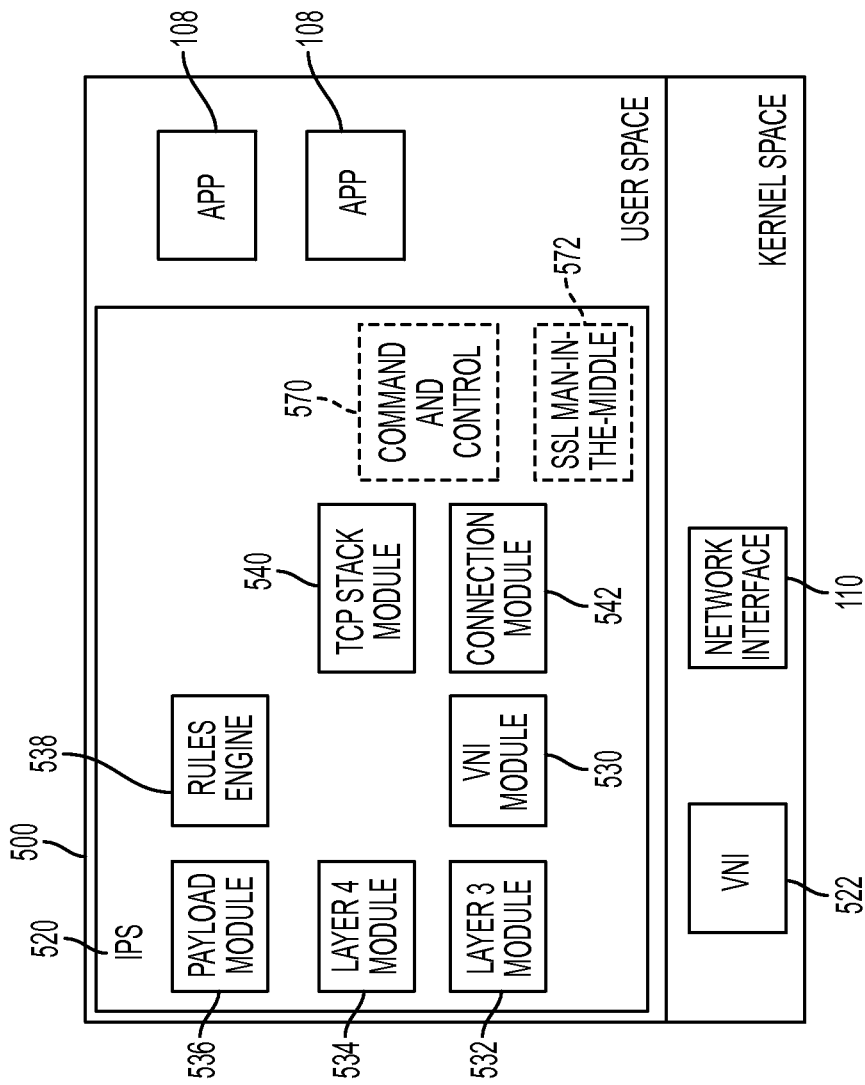
FIG. 5 is an illustration of a mobile device for capturing and analyzing network traffic according to some embodiments.

Methods in accordance with some embodiments, such as method 300 and method 400 described above, may be performed by a portable electronic device such as a mobile device executing an IPS application in restricted user space without heightened privileges. FIG. 5 illustrates a functional block diagram of device 500 executing an IPS application according to methods and systems described herein. Device 500 is conceptually divided into user space and kernel space. User space may include processes that have access to a limited part of memory, whereas processes running in kernel space may have access to all of the memory. Processes running in user space with normal (non-heightened) user privileges do not generally have access to the kernel space. User space processes can only access a small part of the kernel via an interface exposed by the kernel through system calls. Each user space process normally runs in its own virtual memory space, and, unless explicitly allowed, cannot access the memory of other processes.

Device 500 includes one or more applications 108 and IPS application 520 running in user space. Device 500 also includes virtual network interface 522 and network interface 110 running in kernel space. Although virtual network interface 522 is shown here is a separate functional block, it is to be understood that virtual network interface 522 is created by IPS application 520. Thus, in some embodiments, virtual network interface 522 may only exist when IPS application 520 is running.

IPS application 520 includes virtual network interface module 530, layer 3 module 532, layer 4 module 534, payload module 536, rules engine 538, TCP stack module 540, and connection module 542. According to some embodiments, IPS application 520 may also include command and control module 570 and SSL man-in-the-middle module 572.

Generally, virtual network interface module 530 and connection module 542 manage packet transmission to and from IPS application 520. Virtual network interface module 530 manages communication with virtual network interface 522 (sending/receiving data packets to/from virtual network interface 522), while connection module 542 manages establishing/maintaining connections (e.g., stream socket connections) with nodes of the network and sending and receiving data packets over those connections. Layer 3 module 532, layer 4 module 534, and TCP stack module 540 generally provide two sets of functions. The first set of functions includes parsing and analysis of data packets for application of one or more rules. The second set of functions is replicating communications functions normally handled by the kernel. Because the transmission of data packets from a source application to a node of the network and vice versa is interrupted by the data capture methods described herein, IPS application 520 replicates communications functions in user space. In this way, IPS application 520 can capture, send, and receive network traffic to/from the device without requiring privileged access to the kernel's communication functions.

Virtual network interface module 530 manages creation and interaction with virtual network interface 522. For example, at startup of IPS application 520, virtual network interface module 530 executes a function call to establish virtual network interface 522 and attached IPS application 520 to virtual network interface 522. After establishment of virtual network interface 522, virtual network interface module 530 reads from the inbound queue(s) of virtual network interface 522. For example, execution of a read function may return the contents of a buffer in which data traffic generated by one or more applications 108 running on the device is queued. According to some embodiments, virtual network interface module 530 retrieves data from the queue a byte at a time and assembles the bytes into a data packet. Virtual network interface module 530 may communicate with TCP stack module 540 to determine when a data packet is assembled, for example, by checking validity/integrity according to standard protocols.

According to some embodiments, an assembled data packet may be passed from virtual network interface module 530 to layer 3 module 532. Data may be queued in virtual network interface 522 as layer 3 IP packets and, thus, virtual network interface module 530 assembles a layer 3 IP packet and passes the IP packet to layer 3 module 532. Layer 3 module 532 may strip the IP header from the data packet and parse the information in the layer 3 module. The parsed information may be used to apply one or more rules using rules engine 538. The parsed information may also be used by connection module 542 to establish connections with a destination node of the network. Stripping of the IP packet of the layer 3 header (IP header) may result in a layer 4 packet (e.g., TCP packet).

The layer 4 TCP packet may be passed to layer 4 module 534. Layer 4 module 534 may strip layer 4 headers (e.g., TCP headers) and parse the headers to extract relevant information. The information may be passed to rules engine 538 to apply rules associated with information in the layer 4 header. Layer 4 module 534 may also communicate with TCP stack module 540 to parse and/or process information in the layer 4 header.

Stripping of the layer 4 header from the data packet by layer 4 module 534, may reveal the payload of the data packet. The payload may be passed to payload module 536. Payload module 536 may process the payload and apply one or more rules in conjunction with rules engine 538. According to some embodiments, payload module 536 may determine that the content of the payload is insufficient to apply one or more rules, and may direct the payload to a buffer. Upon processing a subsequent payload, the payload module may combine the subsequent payload with one or more payloads in the buffer and apply one or more rules in conjunction with the rules engine.

According to some embodiments, after processing the payload of the data packet, the data packet may be passed to connection module 542 for forwarding to a node of the network. For example, after processing an outbound data packet by applying one or more rules and determining that the data packet may be transmitted by the device to the node of the network for which it is intended, the data packet may be passed to connection module 542. Connection module 542 may check whether a connection with the node of the network for transmission of the data packet exists. If no connection exists, connection module 542 may establish a connection.

For example, connection module 542 may execute a system call to open a socket, as is known in the art. Connection module 542 may use information from the header of the data packet (for example, parsed by layer 3 module 532 and/or layer 4 module 534) to establish the connection. For example, the information may include IP address and port number of the destination node and destination application and IP address and port number of the sending application running on the device. According to some embodiments, connection module 542 can open a stream socket, such as a TCP socket, and/or a datagram socket, such as a UDP socket, as is known in the art, depending on the type of data packet as determined by parsing headers of the data packet.

According to some embodiments, once a connection has been established (e.g., a TCP socket has been opened), connection module 542 may write header-less data packets to the connection. The processing and transmission of the data packet is then handled by network interface 110.

In some embodiments, the IPS application may also function as one end of a VPN to forward data from source applications on the mobile device to nodes of the network over a VPN connection with a VPN server. Instead of establishing a socket connection for each destination node/port, a single socket connection can be established with a VPN server. Data sent to the VPN server through this single socket connection can then be routed to its destination node/port by the VPN server. In these embodiments, instead of forwarding payload-only packets to socket connections with destination nodes/ports, the IPS application can forward TCP/IP data packets (or some other routing protocol packets) to the socket connection with the VPN server (e.g., using layer 3 module 532 and/or layer 4 module 534). The headers for these packets can include information for the destination node/port, not for the VPN server. The kernel level socket connection networking functionality can further wrap the packets with additional headers for routing to the VPN server over the network depending on the type of socket connection. For example, payload data can be wrapped by the IPS application with TCP/IP headers for the destination node/port of the payload, and the kernel level socket connection networking functionality can further wrap this TCP/IP packet with TCP/IP headers for routing to the VPN server. The VPN server would then remove the outer TCP/IP headers and determine the destination node/port from the inner TCP/IP headers. Similar operations can be performed with respect to socket connection protocols other than TCP/IP. For example, a TCP/IP packet can be encapsulated by the kernel level socket connection networking functionality based on the Generic Routing Encapsulation (GRE) protocol, secure sockets layer (SSL) protocol, or any other. In some embodiments, the IPS application may encapsulate a data packet (e.g., a TCP/IP) packet based on the Generic Routing Encapsulation (GRE) protocol, secure sockets layer (SSL) protocol, or any other. In some embodiments, packets (e.g., TCP/IP packets) may be encrypted by the IPS application and/or by kernel level functionality.

Connection module 542 may monitor established connections to determine whether data has been sent back from the network. If new data is detected in a connection's queue, connection module 542 may get the data packet from the socket and forward it to payload module 536 for parsing and application of one or more rules. According to some embodiments, after processing the payload, the data packet may be forwarded to layer 4 module 534 for construction of a layer 4 data packet. Layer 4 module 534 may encapsulate the data packet in a layer 4 header, such as a TCP header, using information from connection module 542 and/or TCP stack module 540. For example, because the socket from which the data packet was retrieved is associated with a destination application running on the device, layer 4 module 534 can use that association to create a header with information specific to the destination application (e.g., port number). According to some embodiments, once a layer 4 data packet has been assembled, the packet is passed to layer 3 module 532 for construction of a layer 3 data packet. The layer 3 data packet may be constructed by encapsulating the data packet with a layer 3 header, such as an IP header. Once the layer 3 data packet is constructed, the data packet may be passed to virtual network interface module 530 where the data packet is written to the virtual network interface for retrieval of the data packet by the destination application.

According to some embodiments, TCP stack module 540 manages ensuring that the protocol specifications are enforced correctly when data packets are constructed and forwarded (e.g., by connection module 542 and virtual network interface module 530). Although referred to herein as "TCP" stack module, TCP stack module 540 can be configured to handle other protocols such as UDP, ICMP, etc. TCP stack module 540 may interact with layer 4 module 534 and layer 3 module 532 to ensure that the appropriate protocol rules are followed. For example, TCP stack module 540 may ensure headers are the correct length, ensuring that certain fields that are required to be 0 are 0, checking for certain fields that can't be anything other than a 0 or a 1. TCP stack module 540 may determine that if certain flags of a data packet are set then a specific response can be sent to the source (e.g., source application running on the device or source node sending data to the device) to provide acknowledgement, (for example, of a new sequence number). For example, TCP requires that every single byte be acknowledged. Thus, when IPS application 520 receives a TCP data packet with data generated by an application on the device, IPS application 520 sends an acknowledgement back to the application. For example, TCP stack module 540, layer 4 module 534, and/or layer 3 module 532 construct an acknowledgement data packet, which is then written to virtual network interface 522 for retrieval by the application.

According to some embodiments, IPS application 520 includes command and control module 570. Command and control module 570 may implement functionality to receive updated rule sets or other updates from a central administrator. For example, command and control module 570 may communicate with an update server connection to the network to receive updated rule sets or other updates to IPS application 520. In some embodiments, command and control module 570 can report device status to a central administration node on the network (e.g., with statuses such as good, compromised, updated, etc.).

According to some embodiments, IPS application 520 includes SSL man-in-the-middle module 572. This module may be used to process encrypted communication. For example, where an application generates data using an encryption method (e.g., https), SSL man-in-the-middle module 572 decrypts the data prior to further processing (e.g., prior to applying rules) by IPS application 520 and encrypts the data prior to forwarding to its destination.

Rule Examples

Described below are examples of rules that may be applied to data packets according to the methods and systems described herein. These examples are provided to illustrate how rules may be formulated and applied and are not intended to be exhaustive of the types of rules that may be implemented or of the types of data in data packets that may be analyzed according to embodiments of the methods and systems described herein. It can be appreciated that the systems and methods described herein enable analysis of the entire contents of data packets, and therefore, a rule can be formulated to analyze any information in a data packet and provide any response.

Block transport layer security 1.3. The header information can be analyzed to determine what version of transport layer security is being used or requested by a node of the network (e.g., during a handshake procedure). If, for example, a less secure TLS version is being requested (e.g., TLS 1.3) then the connection is not allowed (the handshake procedure is terminated).

Block the Internet Control Message Protocol (ICMP) protocol. This rule is associated with a header pattern match. The ICMP is one of the main protocols of the IP Suite and is used by network devices, like routers, to send error messages indicating, for example, that a requested service is not available or that a host or router could not be reached. ICMP differs from transport protocols such as TCP and UDP in that it is not typically used to exchange data between systems, nor is it regularly employed by end-user network applications. It is general recommended practice to not allow its use.

Block packets if the TCP sequence number wrong. If the TCP sequence number is wrong then the data packet may be dropped. According to some embodiments, the sequence numbering is managed/tracked by the TCP stack module within the IPS application. A simple compare between the expected sequence number as specified by the TCP stack module and the sequence number contained in the header of the data packet reveals whether the sequence number of the data packet is correct. If not, the data packet is dropped.

Block packets if the checksum is wrong. Similarly to blocking if the sequence number is wrong, the checksum is a parameter that can be used to determine the integrity of the data packet. The TCP stack module can maintain/track the checksum value and if the checksum in the data packet header does not match, then the data packet is dropped.

Block heartbleed pattern. This rules focuses on the contents of the payload of the data packet. With certain types of connections (e.g., TLS/SSL), there is a "keep alive" or "heartbeat" message that can be exploited through by including a mismatch in the message. The block heartbleed pattern rule searches for the message with the mismatch in the payload and blocks the data packet if the mismatch is found. For example, a "keep alive" message normally works by requesting the receiving computer to send back a word (e.g., "apple"). The message includes the word being requested and includes the size of the word (e.g., five letters long). The receiving computer will send back the word apple. The heartbleed attack exploits a vulnerability where the message would include a request for the word apple but would designate the word apple to be 60,000 letters long. The computer would reply with the contents of its memory up to 60,000 letters long, which may include sensitive information. This rule checks for the mismatch between the word being request and the stated size of that word. If there is a mismatch, the data packet is blocked.

Deny requests to downgrade to export-grade (weak) cipher suites. This request may happen during a handshake negotiation during the establishment of a connection between the device and a node of the network. The node of the network may request to use, for example, only a 512 byte cyber suite, in which case the handshake is terminated.

Block specified IP addresses (e.g., associated with known botnet or malware infrastructure). This is a simple comparison if the IP header to known bad nodes. If a match is detected, the data packet is blocked.

Block by Geographic location. Information in the data packet header(s) may be associated with geographic locations. This rule may specify that if a data packet is received from, say, Russia, which matches a blacklist, then the data packet is dropped.

As stated above, the above rules are intended to be illustrative only. Many more rules, whether applicable to header information or payload information, are also contemplated according to the systems and methods described herein.

Figure 6:
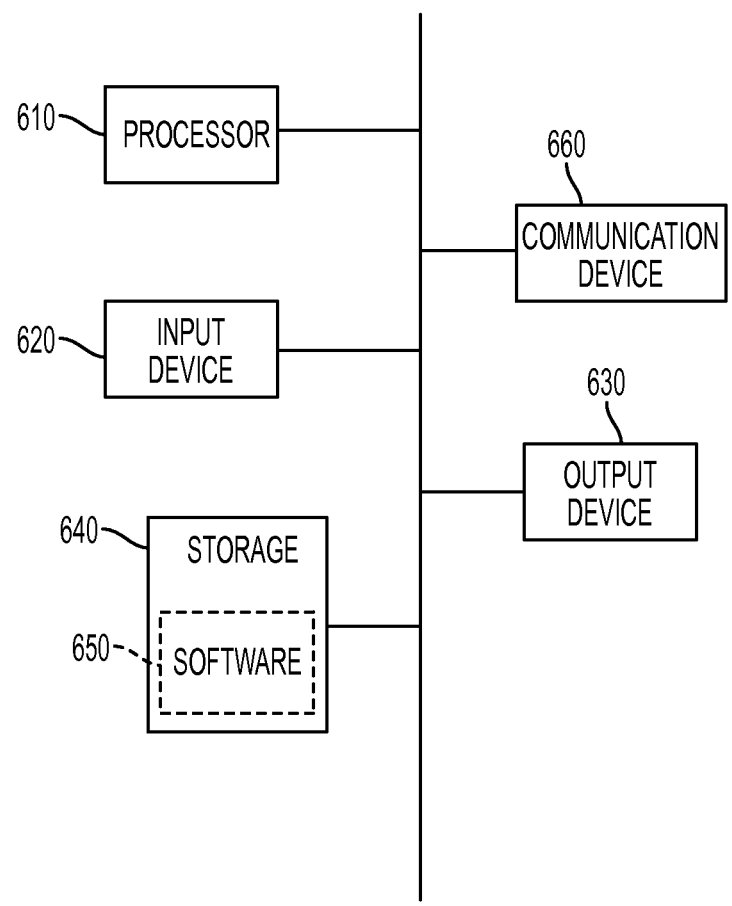
FIG. 6 is an illustration of a mobile device on which one or more systems and methods may be implemented according to some embodiments.

FIG. 6 illustrates an example of a computing device in accordance with one embodiment. Device 600 can be a host computer connected to a network. Device 600 can be a client computer or a server. As shown in FIG. 6, device 600 can be any suitable type of microprocessor-based device, such as a personal computer, workstation, server or handheld computing device (portable electronic device) such as a phone or tablet. The device can include, for example, one or more of processor 610, input device 620, output device 630, storage 640, and communication device 660. Input device 620 and output device 630 can generally correspond to those described above, and can either be connectable or integrated with the computer.

Input device 620 can be any suitable device that provides input, such as a touch screen, keyboard or keypad, mouse, or voice-recognition device. Output device 630 can be any suitable device that provides output, such as a touch screen, haptics device, or speaker.

Storage 640 can be any suitable device that provides storage, such as an electrical, magnetic or optical memory including a RAM, cache, hard drive, or removable storage disk. Communication device 660 can include any suitable device capable of transmitting and receiving signals over a network, such as a network interface chip or device. The components of the computer can be connected in any suitable manner, such as via a physical bus or wirelessly.

Software 650, which can be stored in storage 640 and executed by processor 610, can include, for example, the programming that embodies the functionality of the present disclosure (e.g., as embodied in the devices as described above).

Software 650 can also be stored and/or transported within any non-transitory computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 640, that can contain or store programming for use by or in connection with an instruction execution system, apparatus, or device.

Software 650 can also be propagated within any transport medium for use by or in connection with an instruction execution system, apparatus, or device, such as those described above, that can fetch instructions associated with the software from the instruction execution system, apparatus, or device and execute the instructions. In the context of this disclosure, a transport medium can be any medium that can communicate, propagate or transport programming for use by or in connection with an instruction execution system, apparatus, or device. The transport readable medium can include, but is not limited to, an electronic, magnetic, optical, electromagnetic or infrared wired or wireless propagation medium.

Device 600 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Device 600 can implement any operating system suitable for operating on the network. Software 650 can be written in any suitable programming language, such as C, C++, Java or Python. In various embodiments, application software embodying the functionality of the present disclosure can be deployed in different configurations, such as in a client/server arrangement or through a Web browser as a Web-based application or Web service, for example.

The systems and methods described above can enable monitoring and controlling of network traffic generated and received by a mobile device. The systems and methods can be used to protect mobile devices such as smartphones from viruses, malware, adware, exploits, and other computer attacks.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims.

What is claimed as new and desired to be protected by Letters Patent of the United States is:

1. A method for managing network traffic comprising:
    at a portable electronic device connected to a network:
        restricting at least one application running in restricted user space on the device from operating on data packets until the data packets pass up through a communication stack to an application layer of the communication stack;
        calling, by a monitoring application running in the restricted user space, a virtual private network function to establish a virtual network interface, wherein calling the virtual private network function includes passing a null route table and an internal network address;
        in response to the call of the virtual private network function, establishing, by a kernel process, the virtual network interface configured with the null route table and internal IP address, wherein the virtual network interface is configured to queue network traffic originated by one or more of the applications running in restricted user space on the device;
        monitoring, by the monitoring application running in restricted user space, the virtual network interface for queued data originated by the one or more of the applications running in restricted user space on the device;
        assembling, by the monitoring application, a data packet from at least some of the queued data, wherein the data packet includes data intended for a node of the one or more nodes of the network;
        applying, by the monitoring application, a first set of rules to the data packet;
        in accordance with a determination that application of the first set of rules to the data packet triggers a predetermined response associated with the first set of rules, processing, by the monitoring application, the data packet according to the predetermined response associated with the first set of rules; and
        in accordance with a determination that application of the first set of rules does not trigger the predetermined response, forwarding, by the monitoring application, at least the data intended for the node to a connection with the node for transmission to the node.

2. The method of claim 1 comprising:
    monitoring the connection with the node of the one or more nodes of the network for inbound data received by the device from the node;
    assembling an inbound data packet associated with a destination application running on the device from at least some of the received inbound data;
    applying a second set of rules to the inbound data packet;
    in accordance with a determination that application of the second set of rules to the inbound data packet triggers a predetermined response associated with the second set of rules, processing the data packet according to the predetermined response associated with the second set of rules; and
    in accordance with a determination that application of the second set of rules to the inbound data packet does not trigger a predetermined response associated with the second set of rules, forwarding the inbound data packet to the virtual network interface for retrieval by the destination application.

3. The method of claim 2, wherein forwarding the inbound data packet to the virtual network interface for retrieval by the destination application comprises adding headers to the inbound data packet and forwarding the inbound data packet with the headers to the virtual network interface.

4. The method of claim 1, wherein assembling the data packet includes assembling at least a header portion and a payload portion, the method further comprising:
    prior to forwarding the at least the data intended for the node to the connection with the node for transmission to the node, establishing the connection with the node using at least some information from the header portion,
    wherein the at least the data intended for the node is forwarded without the header portion.

5. The method of claim 4, wherein the established connection bypasses the virtual network interface.

6. The method of claim 4, wherein the data packet is originated by an application of the one or more applications, the method further comprising:
    maintaining an association between the established connection and the application;
    receiving data from the node through the established connection; and
    forwarding the data to the application based on the association between the established connection and the application.

7. The method of claim 6, wherein a header for the received data is generated based on the association between the established connection and the application and the header is forwarded with the data.

8. The method of claim 1, wherein the method is performed with non-privileged control of the device.

9. The method of claim 1 comprising:
    determining that the data packet does not contain sufficient data to apply a rule of the one or more rules;
    in response to determining that the data packet does not contain sufficient data to apply the rule of the one or more rules, storing at least a portion of the data packet in a buffer;
    in response to detecting a second data packet at the virtual network interface, applying the rule of the one or more rules to a combination of at least a portion of the second data packet and the at least a portion of the data packet stored in the buffer to determine whether the rule applies to the combination;
    in accordance with a determination that application of the rule to the combination triggers a predetermined response associate with the rule, processing the at least a portion of the data packet according to the predetermined response associated with the rule; and
    in accordance with a determination that application of the rule to the combination does not trigger the predetermined response, forwarding the at least a portion of the data packet stored in the buffer and the at least a portion of the second data packet to the connection with the node for transmission to the node.

10. The method of claim 1, wherein the one or applications comprises a plurality of applications.

11. The method of claim 1, wherein the one or more applications include at least one of an email application, a web browser, and a game application.

12. A portable electronic device for managing network traffic comprising:
one or more processors,
memory, and
one or more programs, wherein the one or more programs are stored in the memory and configured to be executed by the one or more processors, the one or more programs comprising instructions for:
restricting at least one application running in restricted user space on the device from operating on data packets until the data packets pass up through a communication stack to an application layer of the communication stack;
calling, by a monitoring application running in the restricted user space, a virtual private network function to establish a virtual network interface, wherein calling the virtual private network function includes passing a null route table and an internal network address;
in response to the call of the virtual private network function, establishing, by a kernel process, the virtual network interface configured with the null route table and internal IP address, wherein the virtual network interface is configured to queue network traffic originated by one or more of the applications running in restricted user space on the device;
monitoring, by the monitoring application running in restricted user space, the virtual network interface for queued data originated by the one or more of the applications running in restricted user space on the device;
assembling, by the monitoring application, a data packet from at least some of the queued data, wherein the data packet includes data intended for a node of the one or more nodes of the network;
applying, by the monitoring application, a first set of rules to the data packet;
in accordance with a determination that application of the first set of rules to the data packet triggers a predetermined response associated with the first set of rules, processing, by the monitoring application, the data packet according to the predetermined response associated with the first set of rules; and in accordance with a determination that application of the first set of rules does not trigger the predetermined response, forwarding, by the monitoring application, at least the data intended for the node to a connection with the node for transmission to the node.

13. A non-transitory computer readable storage medium storing one or more programs, the one or more programs comprising instructions for managing network traffic, which when executed by a portable electronic device, cause the device to:
restrict at least one application running in restricted user space on the device from operating on data packets until the data packets pass up through a communication stack to an application layer of the communication stack;
call, by a monitoring application running in the restricted user space, a virtual private network function to establish a virtual network interface, wherein calling the virtual private network function includes passing a null route table and an internal network address;
in response to the call of the virtual private network function, establish, by a kernel process, the virtual network interface configured with the null route table and internal IP address, wherein the virtual network interface is configured to queue network traffic originated by one or more of the applications running in restricted user space on the device;
monitor, by the monitoring application running in restricted user space, the virtual network interface for queued data originated by the one or more of the applications running in restricted user space on the device;
assemble, by the monitoring application, a data packet from at least some of the queued data, wherein the data packet includes data intended for a node of the one or more nodes of the network;
apply, by the monitoring application, a first set of rules to the data packet;
in accordance with a determination that application of the first set of rules to the data packet triggers a predetermined response associated with the first set of rules, process, by the monitoring application, the data packet according to the predetermined response associated with the first set of rules; and
in accordance with a determination that application of the first set of rules does not trigger the predetermined response, forward, by the monitoring application, at least the data intended for the node to a connection with the node for transmission to the node.

* * * * *